US012745008B2

(12) United States Patent
Nakanishi et al.

(10) Patent No.: US 12,745,008 B2
(45) Date of Patent: Sep. 22, 2026

(54) IMAGING APPARATUS HAVING HYBRID ZOOM OPERATION IN ASSOCIATION WITH CHANGEABLE OPTICAL SYSTEMS

(71) Applicant: Panasonic Intellectual Property Management Co., Ltd., Osaka (JP)

(72) Inventors: Katsuya Nakanishi, Osaka (JP); Takaaki Yamasaki, Osaka (JP); Kenta Mizukoshi, Osaka (JP); Shinichi Yamamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 11 days.

(21) Appl. No.: 18/786,452

(22) Filed: Jul. 27, 2024

(65) Prior Publication Data

US 2025/0047981 A1 Feb. 6, 2025

(30) Foreign Application Priority Data

Aug. 2, 2023 (JP) ................................ 2023-126353

(51) Int. Cl.
*H04N 23/69* (2023.01)
*H04N 23/62* (2023.01)
*H04N 23/63* (2023.01)

(52) U.S. Cl.
CPC ............. *H04N 23/69* (2023.01); *H04N 23/62* (2023.01); *H04N 23/632* (2023.01)

(58) Field of Classification Search
CPC ...... H04N 23/69; H04N 23/62; H04N 23/632; H04N 23/633; H04N 23/663; H04N 23/667
See application file for complete search history.

(56) References Cited

U.S. PATENT DOCUMENTS 6,046,770 A * 4/2000 Uemura ................. H04N 23/69 348/240.99
6,151,070 A * 11/2000 Sato ..................... H04N 5/2628 348/240.99

(Continued)

FOREIGN PATENT DOCUMENTS

JP H04-284433 A 10/1992
JP 2006-319499 A 11/2006

(Continued)

*Primary Examiner* — Chiawei Chen
(74) *Attorney, Agent, or Firm* — Renner, Otto, Boisselle & Sklar, LLP

(57) ABSTRACT

An imaging apparatus comprising: a body to and from which an optical system is configured to be attachable and detachable; an imaging sensor configured to capture a subject image via the optical system to generate image data; an input interface configured to acquire a zoom amount indicating a degree of a zoom operation by a user for the optical system; and a controller configured to scale a cropped image from the image data so as to implement a hybrid zoom operation which changes, from a first focal length, a second focal length, according to the zoom amount acquired by the input interface, the first focal length being formed by the optical system and the second focal length corresponding to an angle of view of the subject image in the image data. The controller is configured to maintain a characteristic of the second focal length with respect to the zoom amount before and after the optical system is changed.

11 Claims, 18 Drawing Sheets

(56) References Cited

U.S. PATENT DOCUMENTS

| | | | | |
|---|---|---|---|---|
| 6,239,914 | B1 * | 5/2001 | Nishiwaki | B41J 2/1634 359/620 |
| 9,509,901 | B2 * | 11/2016 | Matsuzawa | H04N 23/62 |
| 2002/0044206 | A1 * | 4/2002 | Kyuma | H04N 23/663 348/211.99 |
| 2002/0075395 | A1 * | 6/2002 | Ohkawara | H04N 23/69 348/347 |
| 2003/0142970 | A1 * | 7/2003 | Nishida | G03B 15/03 396/155 |
| 2006/0114341 | A1 * | 6/2006 | Morinaga | H04N 23/632 348/240.1 |
| 2009/0167897 | A1 * | 7/2009 | Fujita | H04N 23/69 348/240.1 |
| 2011/0128392 | A1 * | 6/2011 | Kumagai | H04N 23/683 348/208.5 |
| 2013/0113985 | A1 * | 5/2013 | Ikeda | H04N 23/67 348/347 |
| 2016/0150161 | A1 * | 5/2016 | Irie | H04N 25/6153 348/229.1 |
| 2024/0137642 | A1 * | 4/2024 | Yamasaki | H04N 23/815 |

FOREIGN PATENT DOCUMENTS

| | | | |
|---|---|---|---|
| JP | 2007-329689 | A | 12/2007 |
| JP | 2021-057656 | A | 4/2021 |
| JP | 2024-060285 | A | 5/2024 |

* cited by examiner 1
100
200
DISPLAY MONITOR
130
RAM
141
FLASH MEMORY
142
CARD SLOT
170
MEMORY CARD
171
IMAGE SENSOR
110
ADC
111
TG
112
CAMERA CONTROLLER
140
OPERATION UNIT
150
B/M
160
L/M
250
ZOOM LENS DRIVER
221
220
222
223
DIA-PHRAGM DRIVER
261
260
FOCUS LENS DRIVER
211
210
212
LENS CONTROLLER
230
FLASH MEMORY
232
RAM
231

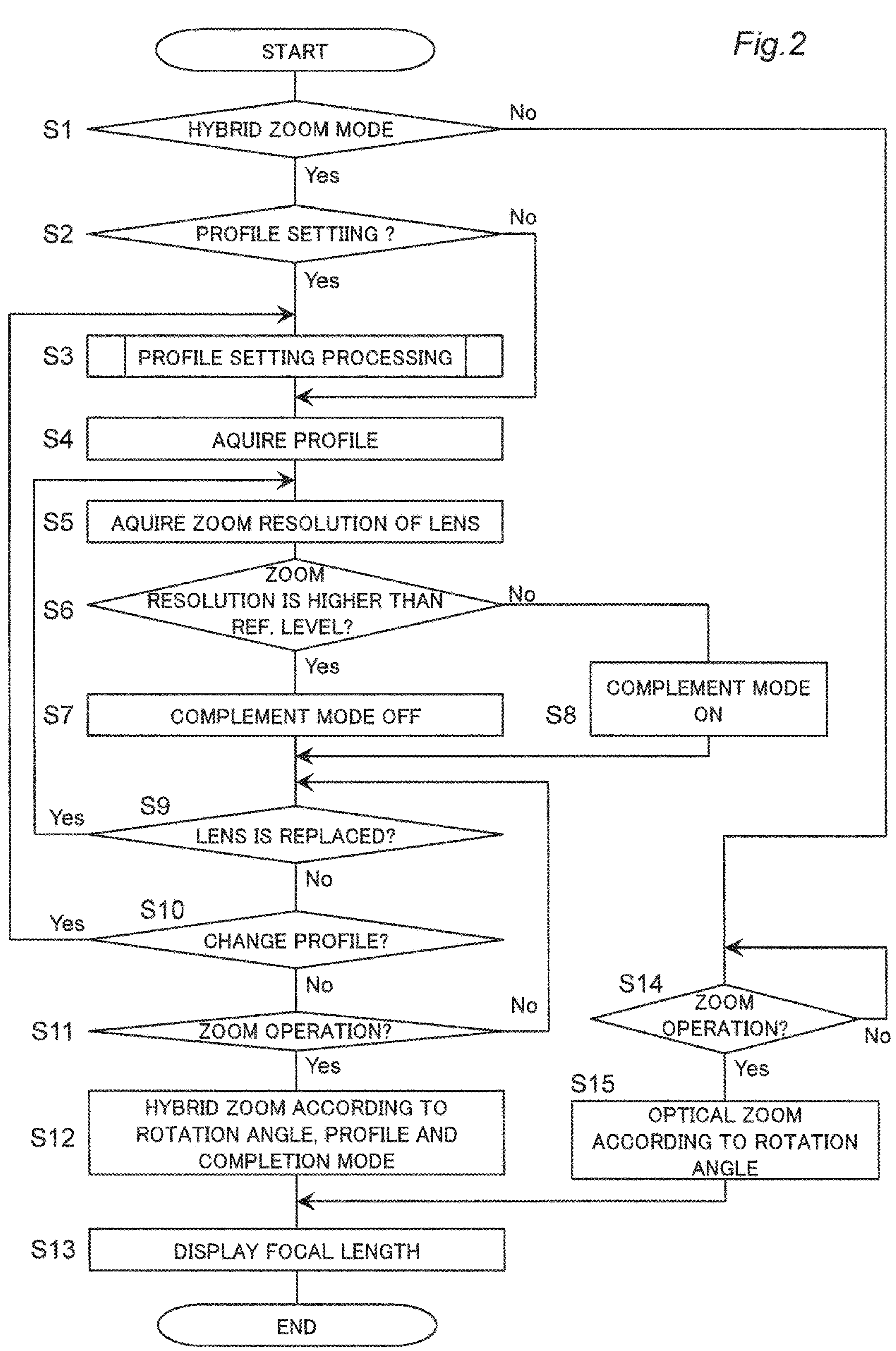
Fig.2
START
S1
HYBRID ZOOM MODE
No
Yes
S2
PROFILE SETTIING ?
No
Yes
S3
PROFILE SETTING PROCESSING
S4
AQUIRE PROFILE
S5
AQUIRE ZOOM RESOLUTION OF LENS
S6
ZOOM RESOLUTION IS HIGHER THAN REF. LEVEL?
No
Yes
S7
COMPLEMENT MODE OFF
S8
COMPLEMENT MODE ON
S9
LENS IS REPLACED?
Yes
No
S10
CHANGE PROFILE?
Yes
No
S11
ZOOM OPERATION?
No
Yes
S12
HYBRID ZOOM ACCORDING TO ROTATION ANGLE, PROFILE AND COMPLETION MODE
S14
ZOOM OPERATION?
No
Yes
S15
OPTICAL ZOOM ACCORDING TO ROTATION ANGLE
S13
DISPLAY FOCAL LENGTH
END EMPHASIZED ZOOM END SELECTION MODE (S33)
S41
DISPLAYS SELECTION SCREEN FOR SELECTING ZOOM END THAT IS EMPHASIZED
S42
USER SELECTION
( i ) W-END EMPHASIZED
( ii ) T-END EMPHASIZED
( iii ) BOTH-END EMPHASIZED
( iv ) OFF
( i )
( ii )
( iii )
( iv )
S43
W-END EMPHASIZED PROFILE SET
S44
T-END EMPHASIZED PROFILE SET
S45
BOTH-END EMPHASIZED PROFILE SET
S46
LINEAR PROFILE SET
RETURN W-END EMPHASIZED PROFILE
HYBRID ZOOM
OPTICAL ZOOM
ELECTRONIC ZOOM
(a) ZOOM RESOLUTION=400
90
60
fα
20
FOCAL LENGTH [mm]
W-END
α
T-END
1.5
1
ELECTRONIC ZOOM MAGNIFICATION
(b) ZOOM RESOLUTION=10
90
60
fα
20
FOCAL LENGTH [mm]
W-END
α
T-END
1.5
1
ELECTRONIC ZOOM MAGNIFICATION T-END EMPHASIZED PROFILE
HYBRID ZOOM
OPTICAL ZOOM
ELECTRONIC ZOOM
(a) ZOOM RESOLUTION=400
90
fβ
60
20
FOCAL LENGTH [mm]
ELECTRONIC ZOOM MAGNIFICATION
1.5
1
W-END
β
T-END
(b) ZOOM RESOLUTION=10
90
fβ
60
20
FOCAL LENGTH [mm]
ELECTRONIC ZOOM MAGNIFICATION
1.5
1
W-END
β
T-END BOTH-END EMPHASIZED PROFILE
HYBRID ZOOM
OPTICAL ZOOM
ELECTRONIC ZOOM
(a) ZOOM RESOLUTION=400
90
fβ
60
fα
20
FOCAL LENGTH [mm]
ELECTRONIC ZOOM MAGNIFICATION
1.5
1
W-END
α
β
T-END
(b) ZOOM RESOLUTION=10
90
fβ
60
fα
20
FOCAL LENGTH [mm]
ELECTRONIC ZOOM MAGNIFICATION
1.5
1
W-END
α
β
T-END LINEAR PROFILE
HYBRID ZOOM
OPTICAL ZOOM
ELECTRONIC ZOOM
(a) ZOOM RESOLUTION=5, COMPLEMENT MODE OFF
FOCAL LENGTH [mm]
ELECTRONIC ZOOM MAGNIFICATION
90
60
20
1.5
1
D
W-END
T-END
(b) ZOOM RESOLUTION=5, COMPLEMENT MODE ON
FOCAL LENGTH [mm]
ELECTRONIC ZOOM MAGNIFICATION
90
60
20
1.5
1
D
d
W-END
T-END

IMAGING APPARATUS HAVING HYBRID ZOOM OPERATION IN ASSOCIATION WITH CHANGEABLE OPTICAL SYSTEMS

CROSS REFERENCE TO RELATED APPLICATION

This application claims priority to Japanese Patent Application 2023-126353 filed on Aug. 2, 2023, the contents of which are incorporated herein by reference.

BACKGROUND

Technical Field

The present disclosure relates to an imaging apparatus having an electronic zoom function.

Background Art

JP H4-284433 A discloses a trimming camera system. In this system, when an electronic zoom operation member of a camera body is operated or an optical zoom operation member of a zoom lens is operated, a trimming magnification of the electronic zoom and a photographing magnification of the optical zoom are similarly determined.

SUMMARY

The present disclosure provides an imaging apparatus capable of easily capturing an image in a range of a focal length desirable for a user.

An imaging apparatus according to one aspect of the present disclosure includes: a body to and from which an optical system is configured to be attachable and detachable; an imaging sensor configured to capture a subject image via the optical system to generate image data; an input interface configured to acquire a zoom amount indicating a degree of a zoom operation by a user for the optical system; and a controller configured to scale a cropped image from the image data so as to implement a hybrid zoom operation which changes, from a first focal length, a second focal length, according to the zoom amount acquired by the input interface, the first focal length being formed by the optical system and the second focal length corresponding to an angle of view of the subject image in the image data. The controller is configured to maintain a characteristic of the second focal length with respect to the zoom amount before and after the optical system is changed.

An imaging apparatus according to one aspect of the present disclosure includes: a body to and from which an optical system is configured to be attached and detached; an imaging sensor configured to capture a subject image via the optical system to generate image data; an input interface configured to acquire a zoom amount indicating a degree of a zoom operation by a user for the optical system; a controller configured to scale a cropped image from the image data so as to implement a hybrid zoom operation which changes, from a first focal length, a second focal length, according to the zoom amount acquired by the input interface, the first focal length being formed by the optical system and the second focal length corresponding to an angle of view of the subject image in the image data; and a setting interface configured to receive a user operation for setting a characteristic of the second focal length. The controller is configured to change the second focal length according to the zoom amount based on the characteristic of the second focal length in the hybrid zoom operation.

According to the imaging apparatus of the present disclosure, it is possible to easily capture an image in a range of a focal length desirable for a user.

BRIEF DESCRIPTION OF DRAWINGS

FIG. 2 is a flowchart illustrating a zoom operation in the digital camera;

DETAILED DESCRIPTION

Hereinafter, embodiments will be described with reference to the drawings as appropriate. However, a detailed description more than necessary may be omitted. It should be noted that the accompanying drawings and the following description are provided for those skilled in the art to fully understand the present disclosure and are not intended to limit the claimed subject matter by these.

1. Configuration

Figure 1:
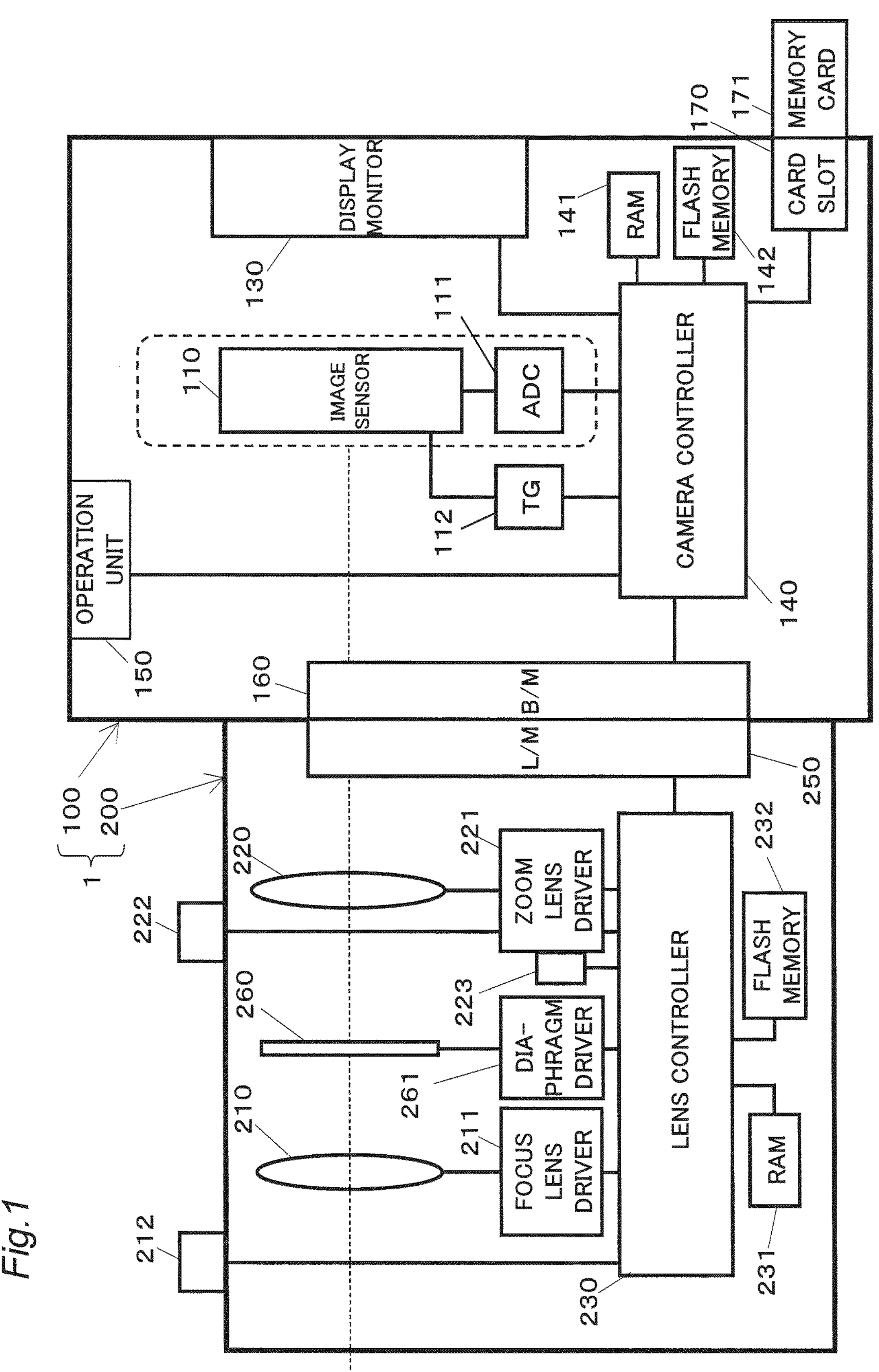
FIG. 1 is a block diagram showing a configuration of a digital camera according to an embodiment of the present disclosure.

FIG. 1 is a block diagram showing a configuration of a digital camera 1 according to an embodiment of the present disclosure. The digital camera 1 of the present embodiment includes a camera body 100 and an interchangeable lens 200 attachable thereto and detachable therefrom.

1-1. Camera Body

The camera body 100 includes an image sensor 110, a display monitor 130, an operation unit 150, a camera controller 140, a RAM 141, a flash memory 142, a body mount 160, and a card slot 170.

The image sensor 110 is an element that captures a subject image incident via the interchangeable lens 200 to generate an image signal. The image sensor 110 includes, for example, a CCD, a CMOS image sensor, or an NMOS image sensor. The AD converter 111 digitizes the image signal generated by the image sensor 110 and outputs image data (also referred to as imaging data). The image data output from the AD converter 111 is input to the camera controller 140. The camera controller 140 performs predetermined image processing on the image data. The predetermined image processing includes, for example, gamma correction processing, white balance correction processing, flaw correction processing, YC conversion processing, electronic zoom processing, and JPEG compression processing. The image sensor 110 and the AD converter 111 are examples of the imaging sensor of the present disclosure.

The image sensor 110 operates at the timing controlled by the timing generator 112. The image sensor 110 generates a still image or a moving image for recording, or a live view image. The live view image is an example of a moving image displayed on the display monitor 130 in order to visualize the real-time imaging result by the image sensor 110 for the user.

The display monitor 130 is an example of a display that displays various pieces of information such as an image, such as a live view image, and a menu screen on a display screen. The display monitor 130 can include, for example, a display device such as a liquid crystal display device or an organic EL device. In addition to or instead of the display monitor 130, the digital camera 1 may include an electronic viewfinder (EVF) or the like including a display screen which is an example of another display in the camera body 100, for example.

The operation unit 150 is a generic name for a user interface that can input an operation (instruction) from the user. When receiving an input of a user operation, the operation unit 150 transmits an operation signal indicating various instructions according to the user operation to the camera controller 140. The operation unit 150 includes, for example, physical buttons, levers, dials, touch panels, switches, and the like. In addition, the operation unit 150 may include virtual buttons, icons, and the like displayed on the display monitor 130.

The camera controller 140 controls the operation of the entire digital camera 1 by controlling components such as the image sensor 110 according to instructions from the operation unit 150. The camera controller 140 may include a hard-wired electronic circuit, or a microcomputer and the like that executes a program. The camera controller 140 transmits a vertical synchronization signal to the timing generator 112. In parallel with this, the camera controller 140 generates a synchronization signal synchronized with the vertical synchronization signal, and transmits the synchronization signal to the lens controller 230 via the body mount 160 and the lens mount 250. The camera controller 140 uses the RAM 141 as a work memory during operations such as control and image processing.

The flash memory 142 stores data such as programs and parameters used when the camera controller 140 performs control.

The body mount 160 is mechanically and electrically connectable to the lens mount 250 of the interchangeable lens 200. The body mount 160 can transmit and receive data to and from the interchangeable lens 200 via the lens mount 250. The body mount 160 transmits the exposure synchronization signal received from the camera controller 140 to the lens controller 230 via the lens mount 250.

In addition, the body mount 160 transmits other control signals received from the camera controller 140 to the lens controller 230 via the lens mount 250. In addition, the body mount 160 transmits the signal received from the lens controller 230 via the lens mount 250 to the camera controller 140.

The card slot 170 can mount a memory card 171, and controls the memory card 171 based on control from the camera controller 140. The digital camera 1 can store image data into the memory card 171 and can read image data from the memory card 171.

1-2. Interchangeable Lens

As shown in FIG. 1, the interchangeable lens 200 is an example of an optical system including, for example, a focus lens 210, a zoom lens 220, a diaphragm 260, and the like. Alternatively, the interchangeable lens 200 includes optical systems such as the focus lens 210, the zoom lens 220, and the diaphragm 260.

The interchangeable lens 200 further includes a focus lens driver 211, a zoom lens driver 221, a diaphragm driver 261, a lens controller 230, a RAM 231, a flash memory 232, and a lens mount 250. The interchangeable lens 200 may further include a camera shake compensation lens in addition to the lenses shown in FIG. 1.

In addition, the interchangeable lens 200 further includes operation members such as a focus ring 212 and a zoom ring 222, for example. The operation member of the interchangeable lens 200 is not limited thereto, and may include, for example, a button or the like provided on the exterior.

The lens controller 230 controls the operation of the entire interchangeable lens 200. The lens controller 230 may include a hard-wired electronic circuit, or a microcomputer and the like that executes a program.

The RAM 231 functions as a work memory used when the lens controller 230 performs control. The flash memory 232 stores information such as programs, parameters, and lens data used during the control by the lens controller 230.

The zoom lens 220 is a lens for changing the magnification of the subject image formed by the optical system. The lens configuration of the zoom lens 220 may include any number of lenses or any number of groups. The zoom lens driver 221 is a mechanical mechanism that moves the zoom lens 220 along the optical axis of the optical system based on the operation of the zoom ring 222 by the user. The position of the zoom lens 220 is detected by the zoom lens position detection unit 223. The zoom lens position detection unit 223 transmits information indicating the detected position of the zoom lens 220 to the lens controller 230.

The zoom ring 222 has a predetermined angular range (for example, 90°) within which an optical focal length by the zoom lens 220 in the interchangeable lens 200 is movable between a wide-angle end serving as the shortest and a telephoto end serving as the longest. The zoom ring 222 is an example of an operation member that can perform a zoom operation by being operated at various rotation angles within the angular range.

The focus lens 210 is a lens for changing a focus state of a subject image incident from the optical system and formed on the image sensor 110. The lens configuration of the focus lens 210 may include any number of lenses or any number of groups. The focus lens driver 211 drives the focus lens 210 to move back and forth along the optical axis of the optical system based on the control of the lens controller 230. The focus lens driver 211 can be implemented by, for example, a stepping motor, a DC motor, an ultrasonic motor, or the like.

The diaphragm 260 adjusts the amount of light incident on the image sensor 110. The diaphragm 260 is driven by a diaphragm driver 262, and the size of the opening is controlled. The diaphragm driver 262 includes a motor or an actuator.

2. Operation

2-1. Overview

The operation of the digital camera 1 configured as described above will be described below.

In the digital camera 1 of the present embodiment, the interchangeable lens 200 performs optical zoom for driving the zoom lens 220 so as to change an optical focal length in accordance with an operation (an example of a zoom operation) for the user to rotate the zoom ring 222.

The digital camera 1 of the present embodiment performs an operation of performing electronic zoom (It may also be referred to as "crop zoom".) by cutting out an image from imaging data of the image sensor 110 by being interlocked with optical zoom, that is, a hybrid zoom operation, according to the zoom operation as described above. According to this hybrid zoom operation, a range of a substantial focal length (so to speak, a pseudo focal length) in which an effect of electronic zoom is taken into consideration in accordance with optical zoom in image data of a photographing result can be extended from a range of an optical focal length of the interchangeable lens 200.

When performing the hybrid zoom operation, the digital camera 1 of the present embodiment maintains the characteristics of the focal length of the hybrid zoom operation with respect to the zoom amount before and after the change of the interchangeable lens 200. Accordingly, the digital camera 1 makes it possible to easily capture an image in a range of a focal length desirable for the user. Hereinafter, the operation of the digital camera 1 according to the present embodiment will be described.

2-2. Overview of Operation

FIG. 2 is a flowchart illustrating a zoom operation in the digital camera 1 of the present embodiment. The processing shown in the present flow is executed by the camera controller 140 of the digital camera 1, for example. The digital camera 1 of the present embodiment receives with the operation unit 150, for example, a user operation in a setting menu, and performs processing of zoom setting and zoom operation.

Figure 3:
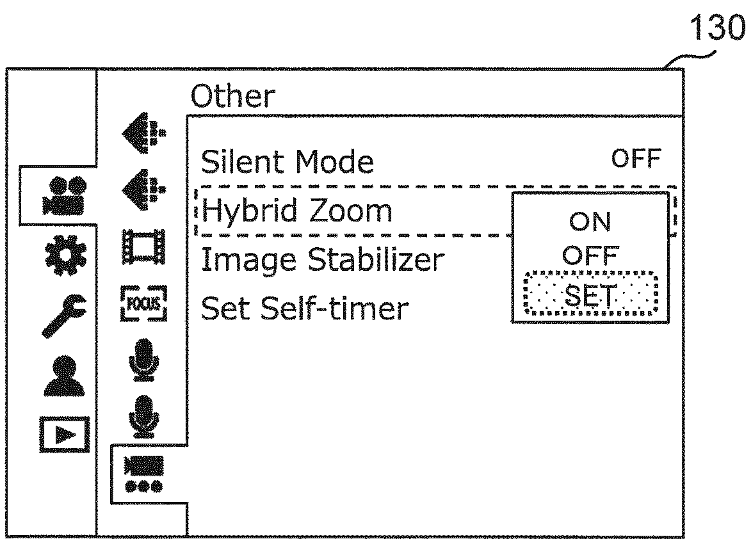
FIG. 3 is a display example of a setting menu in the digital camera.

FIG. 3 shows a display example of a setting menu in the digital camera 1. In the example in FIG. 3, the display monitor 130 of the digital camera 1 displays menu items such as "hybrid zoom" in the setting menu.

In the example in FIG. 3, the "hybrid zoom" of the setting menu receives user operations of turning ON/OFF (enabling/disabling) the hybrid zoom operation and instructing the profile settings described below via the operation unit 150.

In the flow in FIG. 2, the camera controller 140 determines whether to operate in the hybrid zoom mode in which the hybrid zoom operation is performed (S1). The camera controller 140 determines to operate in the hybrid zoom mode when "hybrid zoom" is turned on in the setting menu by a user operation.

If the operation is performed in the hybrid zoom mode (Yes in S1), the camera controller 140 determines whether to perform profile setting processing of setting a profile (S2). For example, when the user selects "hybrid zoom" and selects "setting" in the setting menu in FIG. 3, the camera controller 140 determines to perform the profile setting processing.

The camera controller 140 proceeds to the profile setting processing S3 if Yes in step S2, and proceeds to step S4 if No in step S2. The profile data is characteristic data that defines the relationship between the rotation angle of the zoom ring 222 (an example of the zoom amount indicating the degree of the zoom operation of the user for the interchangeable lens 200) and the focal length of the hybrid zoom operation. In the profile setting processing S3, the degree of change in the focal length of the hybrid zoom operation according to the change in the rotation angle of the zoom ring 222 can be set according to the user's preference. Details of the profile setting processing S3 will be described below.

The camera controller 140 acquires profile data (S4). The profile data is recorded in advance in the flash memory 142. For example, the profile data is recorded in the flash memory 142 in the profile setting processing S3.

Next, the camera controller 140 acquires resolution data indicating the zoom resolution of the interchangeable lens 200 from the lens controller 230 (S5). The zoom resolution is the minimum operation unit from the wide-angle end (W end) to the telephoto end (T end) in which zoom operation can be performed. Alternatively, the zoom resolution is the minimum change unit, of the zoom operation or the position of the zoom lens.

In an example, the zoom resolution is defined by how many pieces the section from the W end to the T end is divided into. For example, when the section from the W end to the T end is divided into 10, the resolution N=10 is expressed. Alternatively, the zoom resolution may be expressed in minimum change units of the focal length (such as 0.1 mm).

The zoom resolution depends on the minimum unit of the position of the zoom lens 220 that can be controlled by the zoom lens driver 221, the minimum unit of the position of the zoom lens 220 that can be detected by the zoom lens position detection unit 223, and the like.

The camera controller 140 determines whether the zoom resolution indicated by the acquired resolution data is higher (better) than the reference level (S6). For example, when the number of divisions N of the section from the W end to the T end is defined as the zoom resolution, the camera controller 140 determines that the zoom resolution is higher than the reference level when the number of divisions N is larger than a threshold value Nth. Alternatively, when the zoom resolution is defined by the minimum change unit of the focal length, the camera controller 140 determines that the zoom resolution is higher than the reference level when the zoom resolution is smaller than the threshold distance.

If determining that the zoom resolution is higher than the reference level (Yes in S6), the camera controller 140 turns off the complement mode (S7). If determining that the zoom resolution is the reference level or less, the camera controller 140 turns on the complement mode (S8). The operation in the complement mode will be described below.

The camera controller 140 detects whether the interchangeable lens 200 has been replaced (S9). For example, when an interchangeable lens 200 is attached to the camera body 100 to which the interchangeable lens 200 has not been attached, the camera controller 140 detects that the interchangeable lens 200 is replaced. It should be noted that, here, the interchangeable lens before replacement and the interchangeable lens after replacement are denoted by the same reference numerals, but the interchangeable lens before replacement and the interchangeable lens after replacement may be individual lenses having different performances.

If detecting that the interchangeable lens 200 has been replaced (Yes in S9), the camera controller 140 returns to step S5 and acquires resolution data indicating the zoom resolution of the interchangeable lens 200 after replacement attached to the camera body 100.

If not detecting that the interchangeable lens 200 has been replaced (No in S9), the camera controller 140 determines whether to change the profile (S10). For example, when selecting to change the profile in the setting menu by a user operation, the camera controller 140 determines to change the profile.

If determining to change the profile (Yes in S10), the camera controller 140 returns to step S3 and executes the profile setting processing S3. If not changing the profile (No in S10), the camera controller 140 proceeds to step S11.

If detecting the zoom operation by the user (Yes in S11), the camera controller 140 performs the hybrid zoom operation (S12). For example, in step S11, the camera controller 140 detects the zoom operation by detecting a change in the rotation angle of the zoom ring 222. In step S12, the camera controller 140 performs the hybrid zoom operation corresponding to the rotation angle of the zoom ring 222, the profile data, and the complement mode. Details of step S12 will be described below.

If not detecting the zoom operation (No in S11), the camera controller 140 returns to step S9. In the example in FIG. 2, steps S9 to S11 are looped, but the camera controller 140 may end the flow in FIG. 2, for example, when the time during which the zoom operation is not detected exceeds a predetermined time, when the power of the camera body 100 is turned off, or the like.

Figure 4:
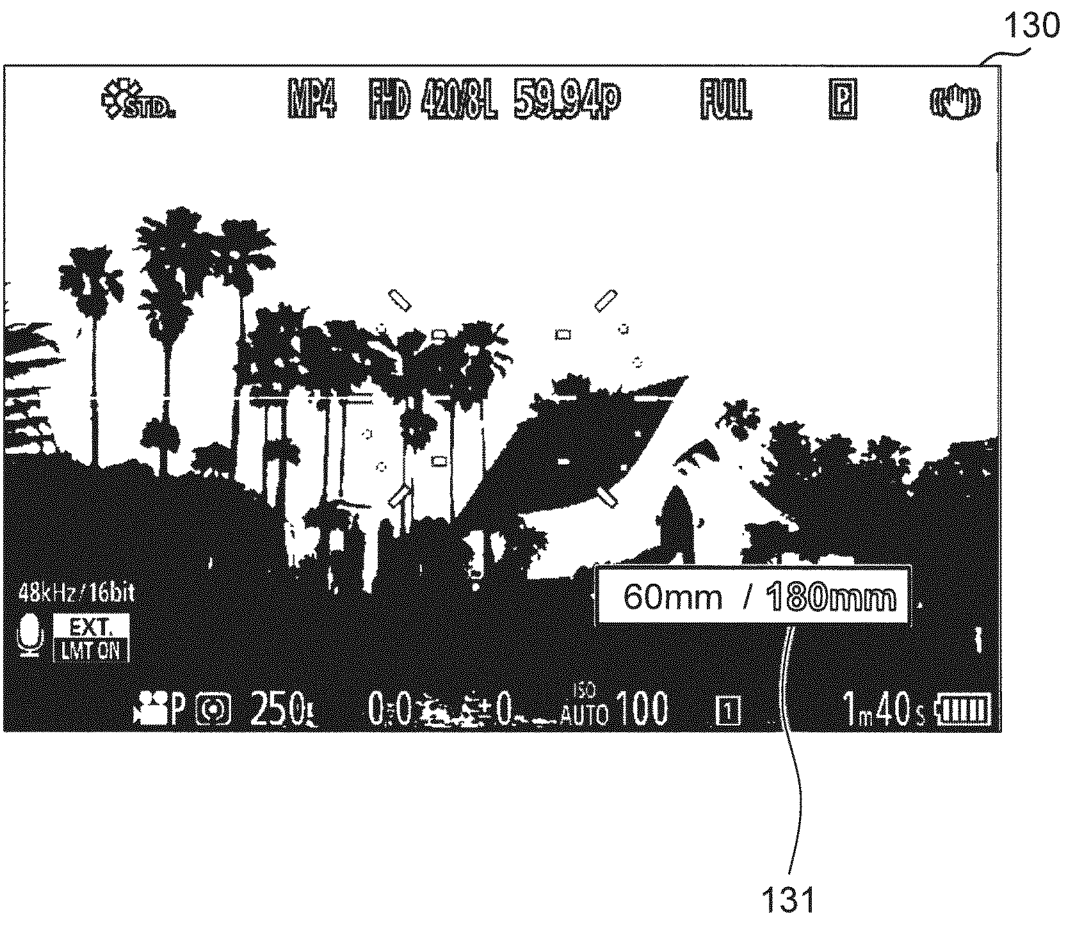
FIG. 4 is a display example of focal length information in the digital camera.

The camera controller 140 causes the display monitor 130 to display the focal length information indicating the focal length changed by the zoom operation (S13). FIG. 4 shows a display example of the focal length information 131 in the digital camera 1. The focal length information 131 represents the focal length of the hybrid zoom. The focal length of the hybrid zoom is expressed by a composite focal length obtained by combining the focal length of the optical zoom and the focal length or enlargement magnification (hereinafter, it may be referred to as a “crop magnification”) of the electronic zoom. This allows the user to learn the composite focal length.

In the example in FIG. 4, the focal length information 131 is shown in a format in which the focal length of the optical zoom (60 mm) and the composite focal length (180 mm) are written side by side. To inform the user that the composite focal length is not the focal length of the optical zoom, the composite focal length may be represented in a different font, color, typeface, or the like from the focal length of the optical zoom.

The display format of the focal length information 131 is not limited thereto. For example, in the focal length information 131, the composite focal length may be displayed in a format in which the focal length of the optical zoom and the crop magnification are arranged side by side (for example, the format such as “60 mm×3.00”). Alternatively, the focal length information 131 may be displayed in a format in which the current composite focal length and the maximum value of the composite focal length (longest composite focal length) are arranged side by side (for example, format such as “120 mm/180 mm”).

The display of the focal length information 131 in FIG. 4 is set to disappear after a predetermined period so as not to disturb the display of the live view image. For example, the camera controller 140 causes the display monitor 130 to display the focal length information 131 when the zoom operation is detected, and to end the display of the focal length information 131 a lapse of a predetermined period after the zoom operation is no longer detected.

On the other hand, if the operation is not performed in the hybrid zoom mode (No in S1), the camera controller 140 waits for the zoom operation by the user (S14), and if detecting the zoom operation (Yes in S14), the camera controller 140 performs the optical zoom operation according to the rotation angle of the zoom ring 222 (S15). The camera controller 140 may end the flow in FIG. 2, for example, when the time during which the zoom operation is not detected exceeds a predetermined time, when the power of the camera body 100 is turned off, or the like.

Figure 5:
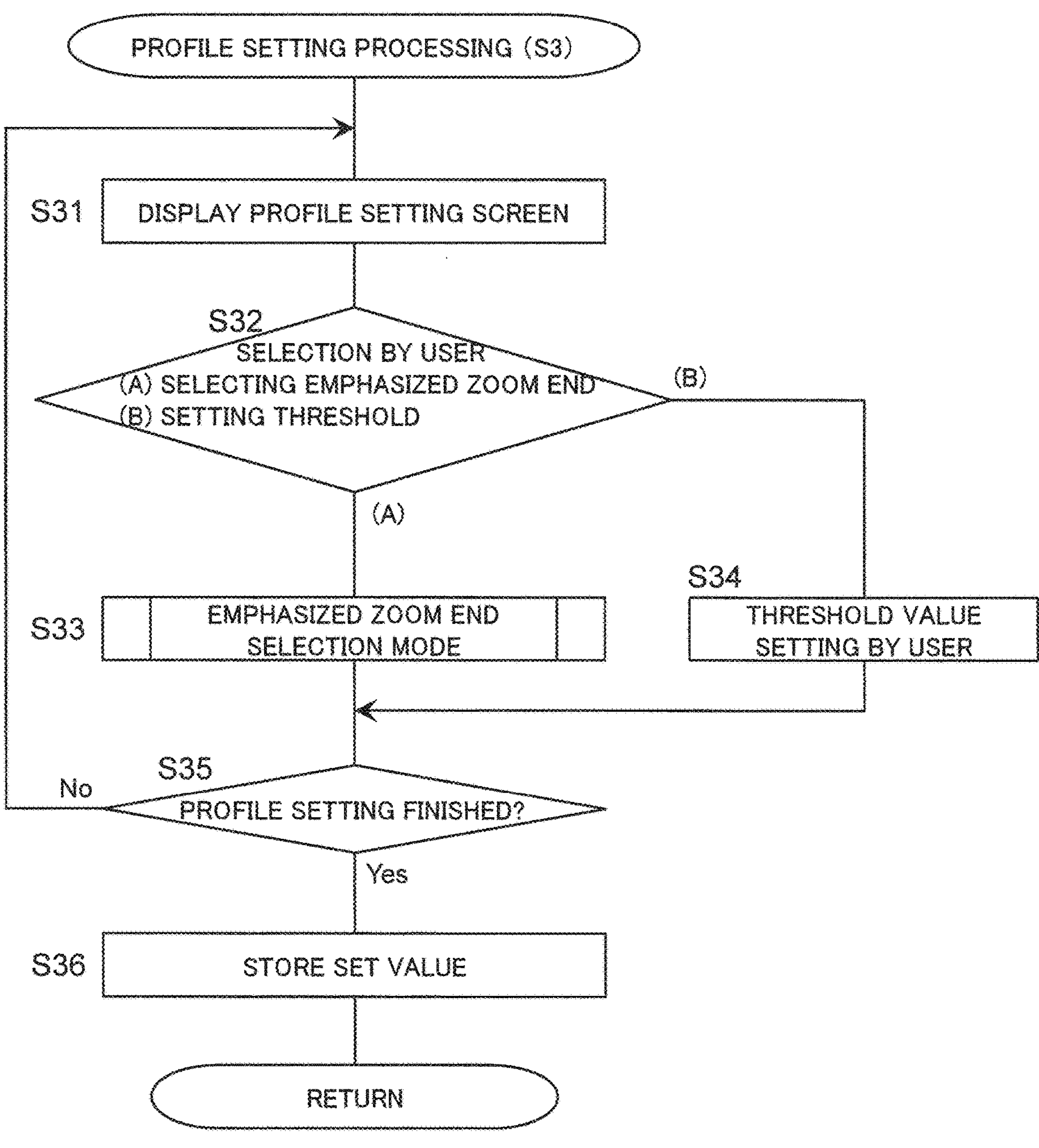
FIG. 5 is a flowchart illustrating profile setting processing in FIG. 2.

2-3. Profile Setting Processing 2-3-1. Overall Flow of Profile Setting Processing Hereinafter, the profile setting processing S3 in FIG. 2 will be described. FIG. 5 is a flowchart illustrating the profile setting processing S3.

Figure 6:
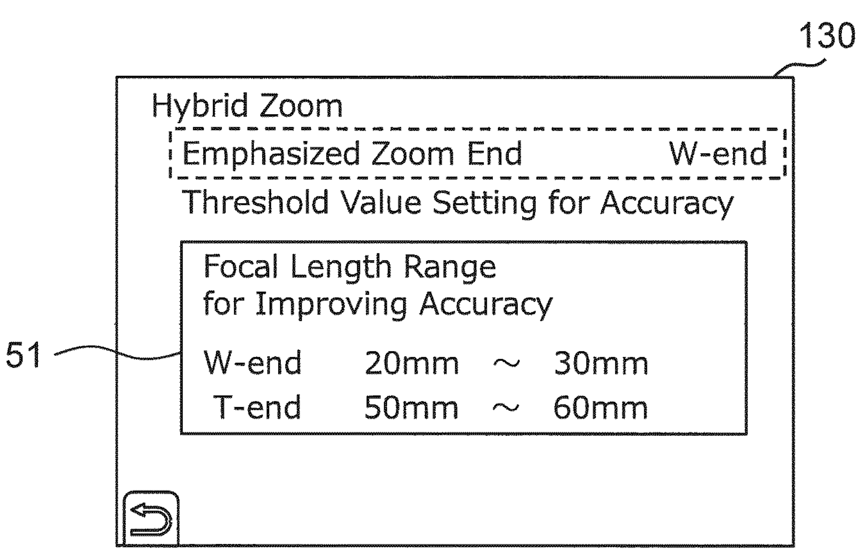
FIG. 6 is an example of a profile setting screen in the digital camera.

In FIG. 5, the camera controller 140 displays a profile setting screen for setting a profile (S31). FIG. 6 shows an example of a profile setting screen. On the profile setting screen in FIG. 6, the user can select a plurality of menus such as (A) selection of a zoom end on which emphasis is placed and (B) threshold value setting related to accuracy improvement of the zoom end on which emphasis is placed. The display field 51 in FIG. 6 indicates the range of the focal length in which the operation for improving the accuracy is performed at the W end and the T end determined based on the threshold value setting of (B).

Returning to FIG. 5, for example, in a state where the profile setting screen illustrated in FIG. 6 is displayed on the display monitor 130, the camera controller 140 receives a user operation of selecting the menu (A) or (B) in the operation unit 150 (S32). The camera controller 140 enters an emphasized zoom end selection mode S33 when the menu (A) is selected by the user operation, and enters a threshold value setting mode S34 by the user when the menu (B) is selected. Details of the emphasized zoom end selection mode S33 and the threshold value setting mode S34 will be described below.

The camera controller 140 determines whether the setting of a profile has been completed based on a user operation (S35). If the setting of the profile is not completed (No in S35), the camera controller 140 returns to step S31 and continues the setting of the profile. If determining that the setting of the profile is completed (Yes in S35), the camera controller 140 stores the information of the profile set in steps S33 and S34 in, for example, the flash memory 142 (S36), and ends the processing shown in FIG. 5.

2-3-2. Emphasized Zoom End Selection Mode

Figure 7:
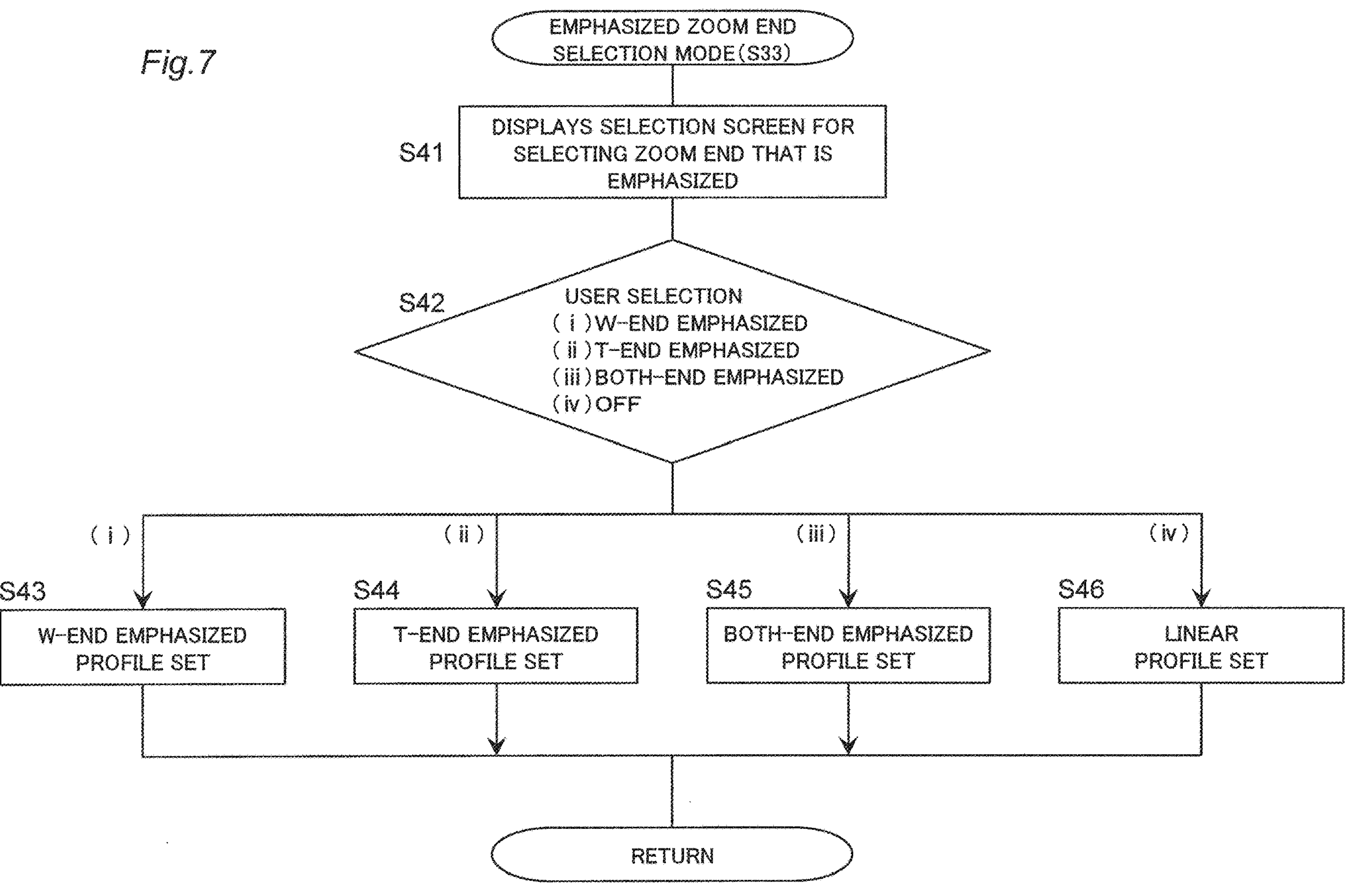
FIG. 7 is a flowchart illustrating an emphasized zoom end selection mode in FIG. 5.
Figure 8:
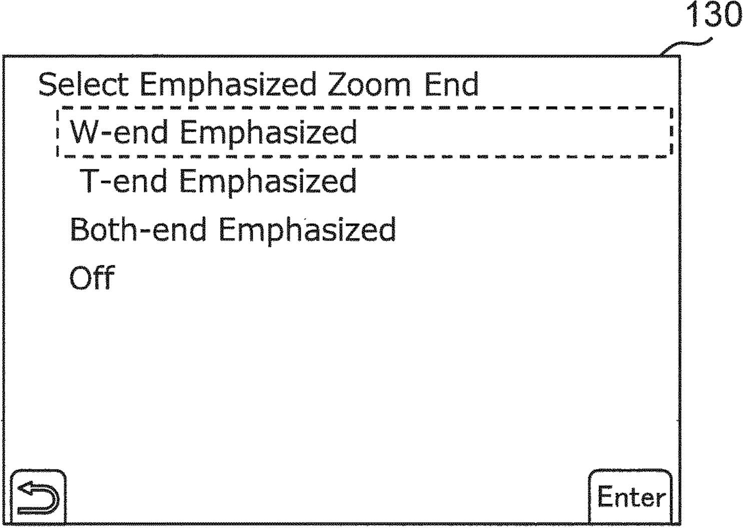
FIG. 8 is an example of a selection screen of an emphasized zoom end in the digital camera.

FIG. 7 is a flowchart illustrating an emphasized zoom end selection mode S33 in FIG. 5. The camera controller 140 displays a selection screen for selecting a zoom end that is emphasized (S41). FIG. 8 shows an example of a selection screen of a zoom end to be emphasized. When the user selects the "emphasized zoom end" menu on the profile setting screen in FIG. 6, the camera controller 140 causes the screen to transition to a selection screen as shown in FIG. 8. On the selection screen in FIG. 8, the user can select any one of the modes of (i) W-end emphasized, (ii) T-end emphasized, (iii) both-end emphasized, and (iv) OFF.

The W-end emphasized mode is a mode for improving the accuracy of focal length adjustment near the W-end. In the W-end emphasized mode, the camera controller 140 allows the focal length near the W-end to be more finely adjusted than other focal length sections such as near the T-end. The T-end emphasized mode is a mode for improving the accuracy of focal length adjustment near the T-end. The both-end emphasized mode is a mode for improving the accuracy of focal length adjustment near both the W-end and the T-end.

Returning to FIG. 7, for example, in a state where the selection screen illustrated in FIG. 8 is displayed on the display monitor 130, the camera controller 140 receives a user operation of selecting any one of the menus (i) to (iv) in the operation unit 150 (S42). The camera controller 140 performs the processing of setting a profile according to the selected menu (S43 to S46). If OFF of the menu (iv) is selected, the camera controller 140 performs linear profile setting (S46). In a linear profile setting, the accuracy of focal length adjustment near the W-end or the T-end does not need to be particularly differentiated from other focal length sections.

Figure 9:
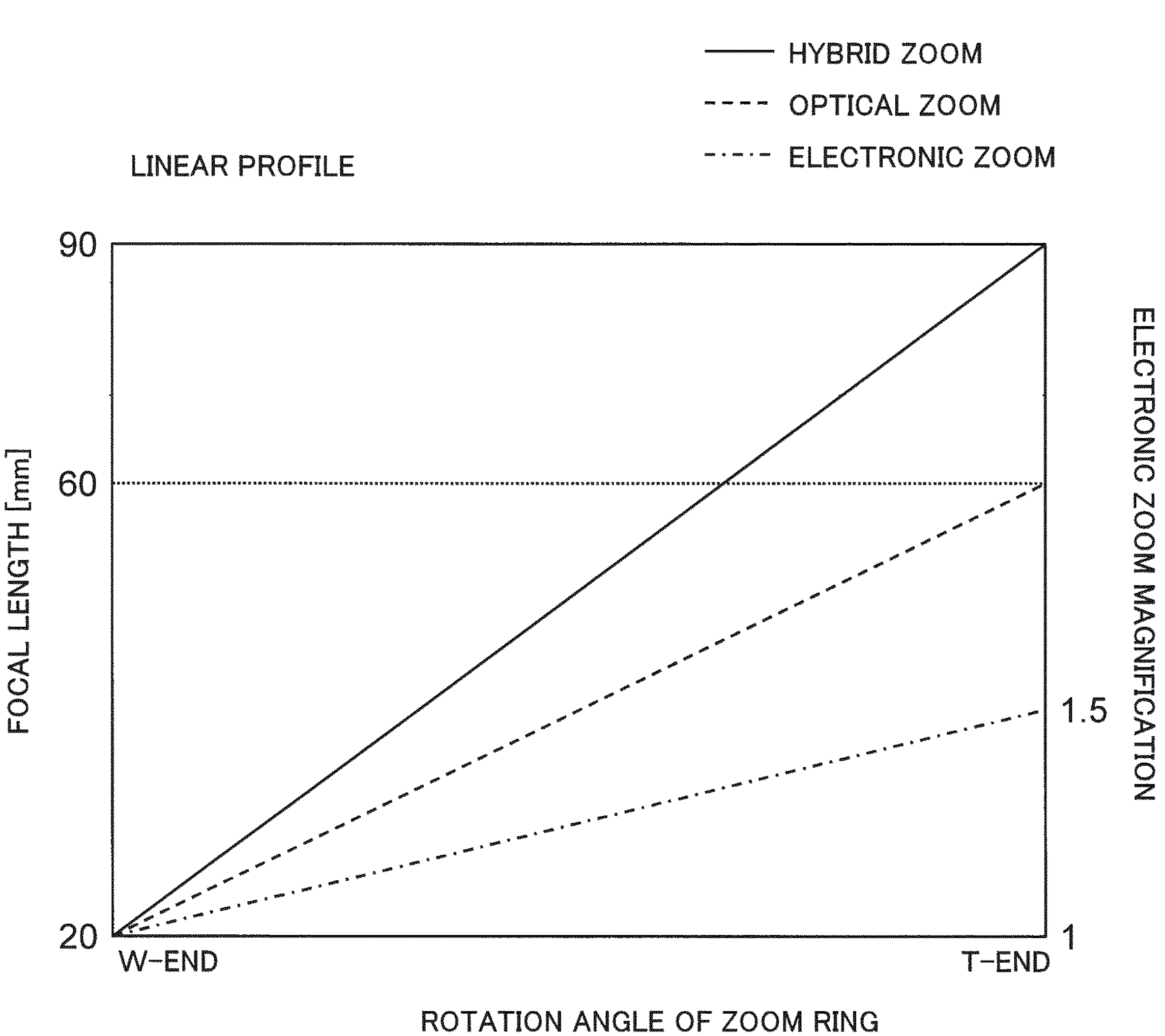
FIG. 9 is a diagram illustrating a linear profile set in the digital camera.

FIG. 9 is a diagram illustrating the linear profile set in step S46. In the linear profile, the correspondence relationship between the optical focal length and the electronic zoom magnification is set so that the focal length between the W-end and the T-end specified by the user as described above gradually (linearly) changes according to the degree of the zoom operation during the hybrid zoom operation. This point will be described with reference to FIG. 9.

A broken-line graph in FIG. 9 exemplifies a correspondence relationship between a rotation angle (an example of a zoom amount) of the zoom ring 222 and the optical focal length of the zoom lens 220. The optical focal length is indicated by the vertical axis on the left side in FIG. 9. For example, in the optical zoom in the interchangeable lens 200, the focal length of the zoom lens 220 linearly changes according to the rotation angle of the zoom ring 222 between the focal length at the W-end (20 mm in FIG. 9) and the focal length at the T-end (60 mm in FIG. 9) as illustrated by a broken line in FIG. 9.

The one-dot chain line graph in FIG. 9 exemplifies the correspondence relationship between the rotation angle of the zoom ring 222 and the magnification of the electronic zoom for implementing the hybrid zoom operation from the optical focal length. The magnification of the electronic zoom is indicated by the vertical axis on the right side in FIG. 9. The magnification of the electronic zoom may be converted into the focal length of the electronic zoom. The focal length of such electronic zoom is calculated, for example, by multiplying the optical focal length of the zoom lens 220 by the electronic zoom magnification. The electronic zoom magnification is represented by a value obtained by dividing the number of diagonal pixels arranged in the diagonal direction of the image sensor 110 by the number of diagonal pixels of the image after electronic zoom.

In FIG. 9, the magnification of the electronic zoom is schematically shown linearly. However, in the linear profile, the focal length (composite focal length) of the hybrid zoom operation only needs to be set to be linear with respect to the degree of the zoom operation, and does not necessarily need to be linear as shown in FIG. 9.

A solid line graph in FIG. 9 exemplifies a correspondence relationship between the rotation angle of the zoom ring 222 and the focal length (composite focal length) of the hybrid zoom operation. The composite focal length is represented by, for example, the sum of the optical focal length of the zoom lens 220 and the focal length of the electronic zoom. As shown in FIG. 9, the composite focal length is set in the digital camera 1 so as to linearly change according to the rotation angle of the zoom ring 222.

For example, the camera controller 140 of the digital camera 1 assigns the setting value of the electronic zoom magnification for each optical focal length classified by the rotation angle of the zoom ring 222. The camera controller 140 stores the setting value of the electronic zoom magnification as described above in the flash memory 142, for example, as setting information on a result of the hybrid setting.

According to the above processing, during the hybrid zoom operation of the digital camera 1 of the present embodiment, the user can use the digital camera 1 with the feeling of operating the zoom ring 222 as with the optical zoom. According to the hybrid zoom operation of the digital camera 1 in the present embodiment, it is possible to reproduce a focal length range desired by the user by performing electronic zoom so as to change in conjunction with optical zoom performed according to a zoom operation of the user.

During the hybrid zoom operation, for example, the lens controller 230 of the interchangeable lens 200 mounted on the digital camera 1 acquires the focal length of the result of the optical zoom according to the rotation angle of the zoom ring 222. The lens controller 230 sequentially transmits the acquired focal length data to the camera body 100 via the lens mount 250.

In the camera body 100, the camera controller 140 receives data on the focal length from the interchangeable lens 200 via the body mount 160, and sequentially determines the electronic zoom magnification based on the focal length of the received data and the setting information on the electronic zoom. The camera controller 140 cuts out an image having a size smaller by the reciprocal of the determined electronic zoom magnification from the entire image indicated by the imaging data on the image sensor 110, for example, and generates image data indicating an image obtained by enlarging the cut out image by the electronic zoom magnification. Thus, the hybrid zoom operation in the digital camera 1 is performed.

According to the hybrid zoom operation according to the linear profile as described above, the composite focal length of the hybrid zoom operation can be gradually changed according to the rotation angle of the zoom ring 222 from the W-end to the T-end.

Figure 10:
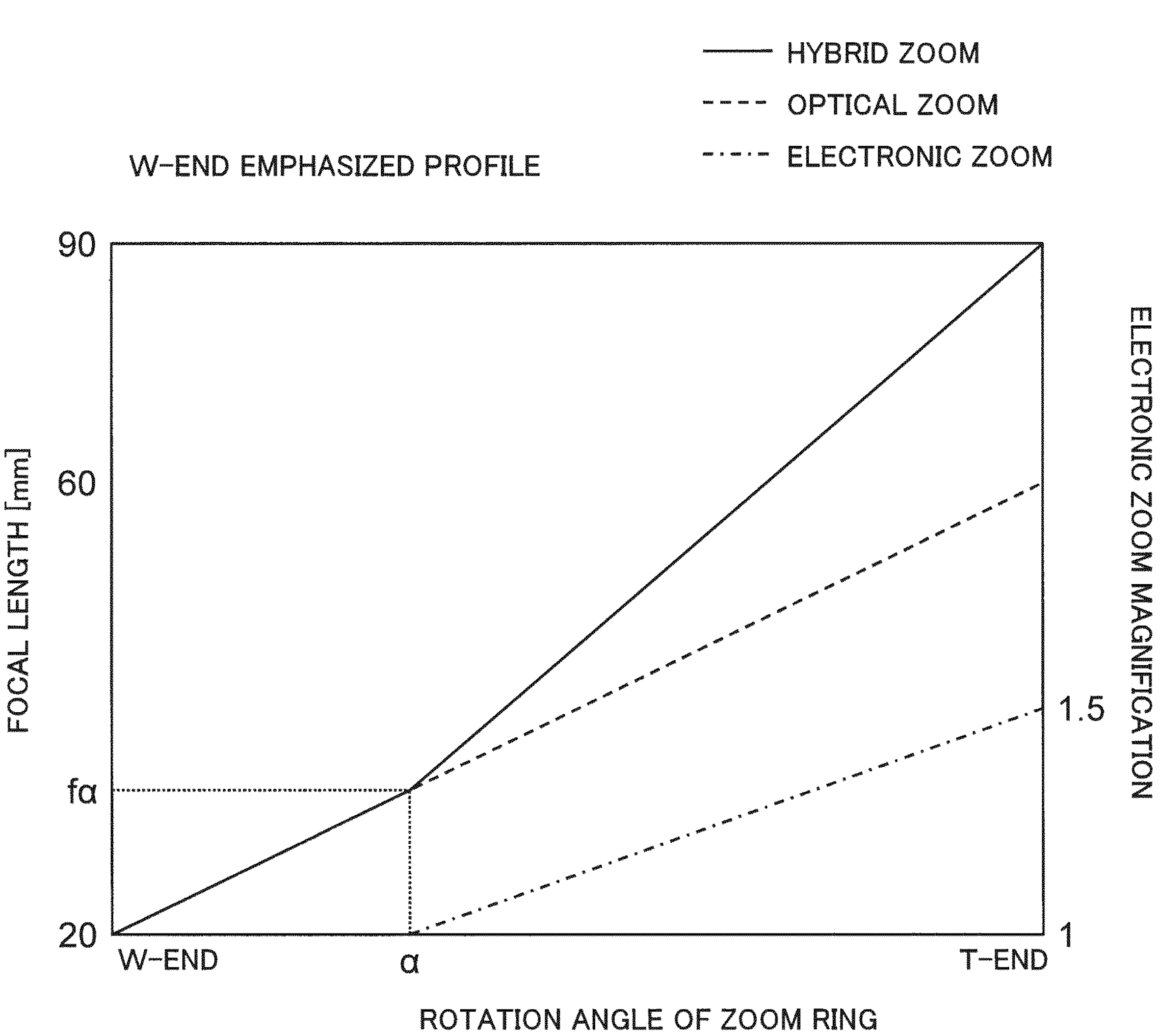
FIG. 10 is a diagram illustrating a W-end emphasized profile set in the digital camera.

FIG. 10 is a diagram illustrating a W-end emphasized profile set in step S43 in FIG. 7. As shown in FIG. 10, in the W-end emphasized profile, the inclination of the composite focal length of the hybrid zoom operation is gentle near the W-end and becomes relatively steep when the composite focal length exceeds the threshold value fa. The threshold value fa can be set in step S34 in FIG. 5 as described below.

To enable the W-end emphasized profile as shown in FIG. 10, in the W-end emphasized profile setting step S43, when the rotation angle of the zoom ring 222 is between the W-end and the threshold angle α, the inclination of the magnification of the electronic zoom is made gentler as compared with other sections. For example, when the rotation angle of the zoom ring 222 is between the W-end and the threshold angle α, the camera controller 140 sets the inclination of the electronic zoom to 0 as illustrated in FIG. 10, or fixes the magnification of the electronic zoom to 1, for example. Here, the threshold angle α is a rotation angle of the zoom ring 222 corresponding to the threshold value fa of the composite focal length.

With the W-end emphasized profile as shown in FIG. 10, in the W-end emphasized mode, the user can more finely adjust the focal length near the W-end as compared with other focal length sections such as near the T-end. In addition, in the W-end emphasized mode, it is possible to reduce the possibility of a sudden change in the composite focal length when the zoom ring 222 is at a position corresponding to the vicinity of the W-end.

Figure 11:
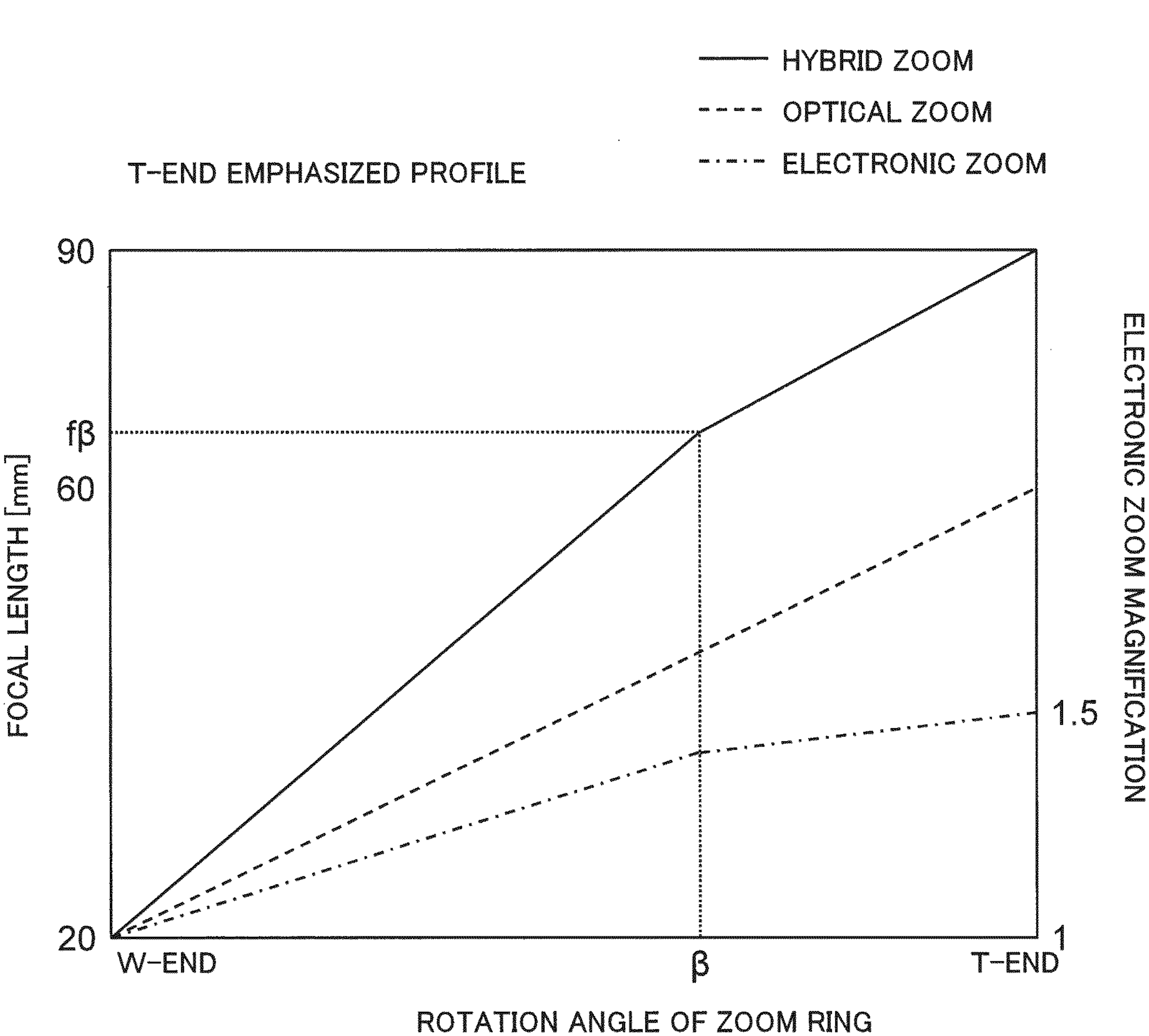
FIG. 11 is a diagram illustrating a T-end emphasized profile set in the digital camera.

FIG. 11 is a diagram illustrating a T-end emphasized profile set in step S44 in FIG. 7. As shown in FIG. 11, in the T-end emphasized profile, the inclination of the composite focal length of the hybrid zoom operation is gentler near the T-end where the composite focal length exceeds the threshold value fβ as compared with when the composite focal length is equal to or less than the threshold value fβ.

To enable the T-end emphasized profile as shown in FIG. 11, in the T-end emphasized profile setting step S44, when the rotation angle of the zoom ring 222 is between the threshold angle β and the T-end, the inclination of the magnification of the electronic zoom is made gentler as compared with other sections. Alternatively, in the T-end emphasized profile setting step S44, when the rotation angle of the zoom ring 222 is between the threshold angle β and the T-end, the magnification of the electronic zoom may be set so as not to change. Here, the threshold angle β is a rotation angle of the zoom ring 222 corresponding to the threshold value fβ of the composite focal length.

With the T-end emphasized profile as shown in FIG. 11, in the T-end emphasized mode, the user can more finely adjust the focal length near the T-end as compared with other focal length sections such as near the W-end. In addition, in the T-end emphasized mode, it is possible to reduce the possibility of a sudden change in the composite focal length when the zoom ring 222 is at a position corresponding to the vicinity of the T-end.

Figure 12:
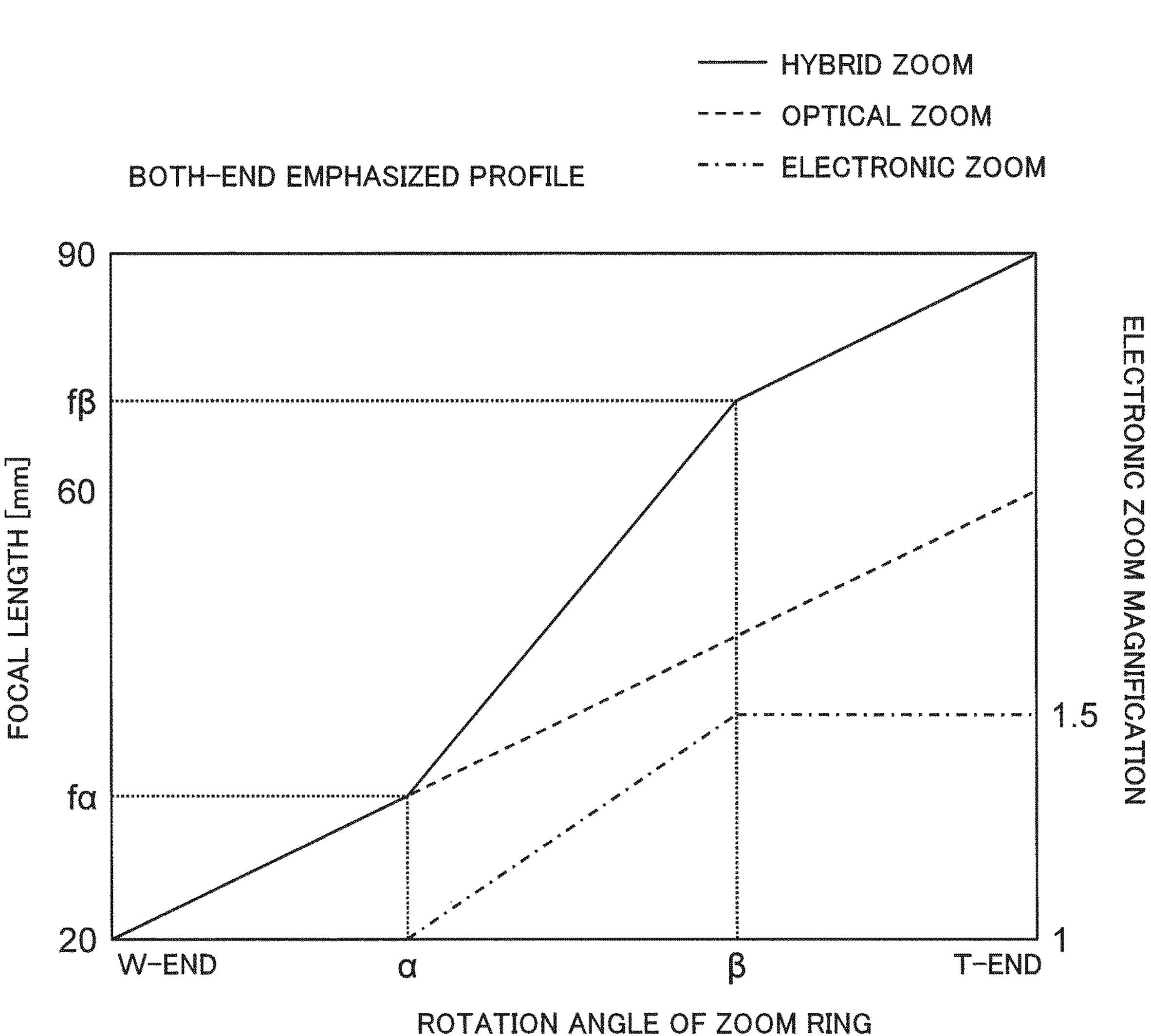
FIG. 12 is a diagram illustrating a both-end emphasized profile set in the digital camera.

FIG. 12 is a diagram illustrating a both-end emphasized profile set in step S45 in FIG. 7. As shown in FIG. 12, in the both-end emphasized profile, the inclination of the composite focal length in the hybrid zoom operation is gentler near the W-end where the composite focal length is equal to or less than the threshold value fa and near the T-end where the composite focal length exceeds the threshold value f than when the composite focal length is larger than the threshold value fa and equal to or less than f.

To enable the both-end emphasized profile as shown in FIG. 12, in the both-end emphasized profile setting step S45, when the rotation angle of the zoom ring 222 is between the W-end and the threshold angle α and between the threshold angle β and the T-end, the inclination of the magnification of the electronic zoom is made gentler as compared with other sections. Alternatively, in the both-end emphasized profile setting step S45, when the rotation angle of the zoom ring 222 is between the W-end and the threshold angle α and between the threshold angle β and the T-end, the magnification of the electronic zoom may be set so as not to change.

With the both-end emphasized profile as shown in FIG. 12, in the both-end emphasized mode, the user can more finely adjust the focal length both near the W-end and near the T-end as compared with other focal length sections. In addition, in the both-end emphasized mode, it is possible to reduce the possibility of a sudden change in the composite focal length when the zoom ring 222 is at a position corresponding to the vicinity of the W-end or the T-end.

As described above, since the user can select the profile settings (S43 to S46) in the emphasized zoom end selection mode S33, it is possible to easily capture an image in the range of the focal length desirable for the user. For example, the user can adjust the focal length with a favorite profile suitable for the user's operation feeling of the zoom ring 222.

2-3-3. Threshold Value Setting by User

Hereinafter, details of the threshold value setting S34 by the user in FIG. 5 will be described. The threshold values a and B in the W-end emphasized profile, the T-end emphasized profile, and the both-end emphasized profile respectively illustrated in FIGS. 10 to 12 can be set in the threshold value setting S34 by the user.

Figure 13:
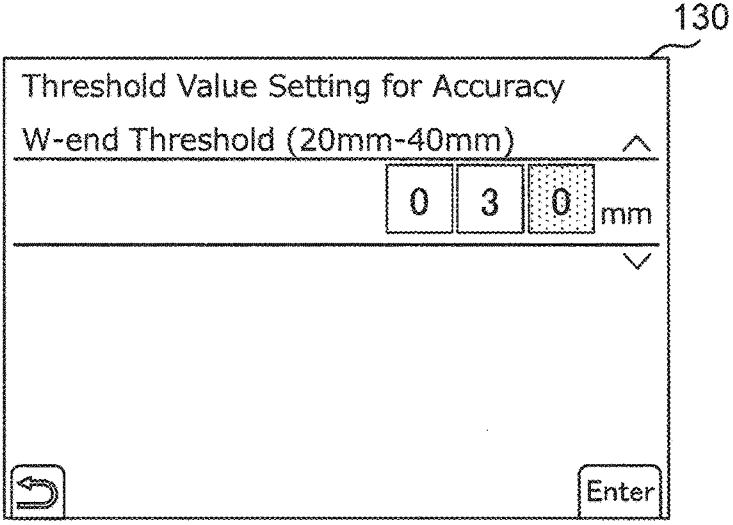
FIG. 13 is an example of a threshold value setting screen of a W-end emphasized profile.
Figure 14:
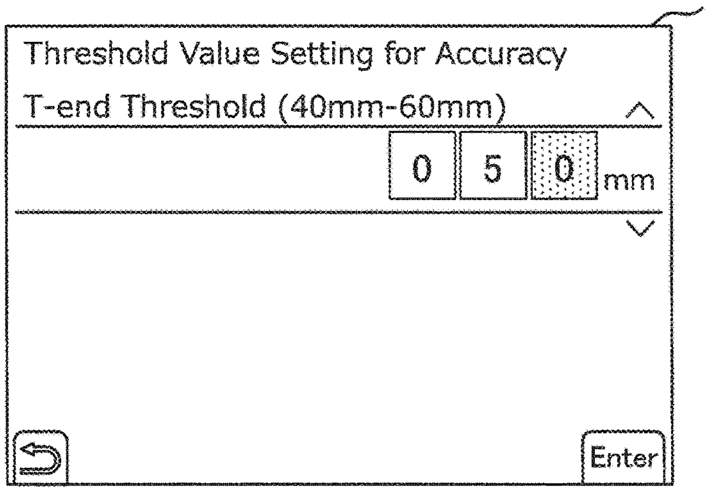
FIG. 14 is an example of a threshold value setting screen of a T-end emphasized profile.
Figure 15:
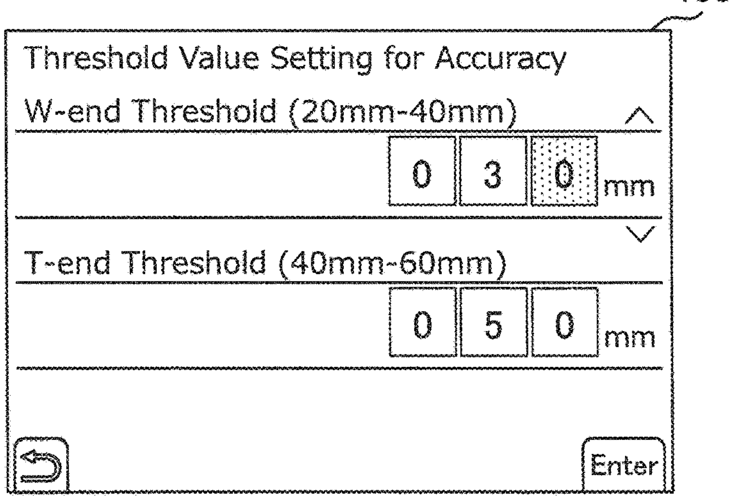
FIG. 15 is an example of a threshold value setting screen of a both-end emphasized profile.

When the user selects the "accuracy improvement threshold value setting" menu on the profile setting screen in FIG. 6, the camera controller 140 causes the screen to transition to a threshold value setting screen as shown in FIG. 13, 14, or 15. On the display monitor 130, the threshold value setting screen in FIG. 13 is displayed when the W-end emphasized mode is selected, the threshold value setting screen in FIG. 14 is displayed when the T-end emphasized mode is selected, and the threshold value setting screen in FIG. 15 is displayed when the both-end emphasized mode is selected.

The threshold value fa can be set on the threshold value setting screen in FIG. 13 corresponding to the W-end emphasized mode. The threshold value fβ can be set on the threshold value setting screen in FIG. 14 corresponding to the T-end emphasized mode. On the threshold value setting screen in FIG. 15 corresponding to the both-end emphasized mode, both the threshold values fa and fβ can be set. The threshold value in each mode may be different.

As described above, since the user can set the threshold value, the focal length can be adjusted with a favorite profile suitable for the user's operation feeling of the zoom ring 222.

2-4. Operation Related to Lens Change

As described above regarding FIG. 2, if detecting that the interchangeable lens 200 has been changed (Yes in S9), the camera controller 140 can perform the hybrid zoom operation according to the profile data without changing the profile (No in S10) (S12). That is, the camera controller 140 can perform the hybrid zoom operation using the interchangeable lens 200 after the change by using the profile data set in the profile setting processing S3 before the change of the interchangeable lens 200.

As described above, the camera controller 140 of the present embodiment maintains the profile data indicating the characteristic of the focal length of the hybrid zoom operation with respect to the zoom amount before and after the change of the interchangeable lens 200.

In the present embodiment, the interchangeable lens 200 before the change and the interchangeable lens 200 after the change are classified with the same resolution. For example, the interchangeable lens 200 before the change and the interchangeable lens 200 after the change have the same resolution.

Even when the zoom resolution of the interchangeable lens 200 is different before and after the change, the profile data is substantially maintained. FIGS. 16 to 19 are diagrams for illustrating substantial maintenance of profile data before and after the change of the interchangeable lens 200.

Figure 16:
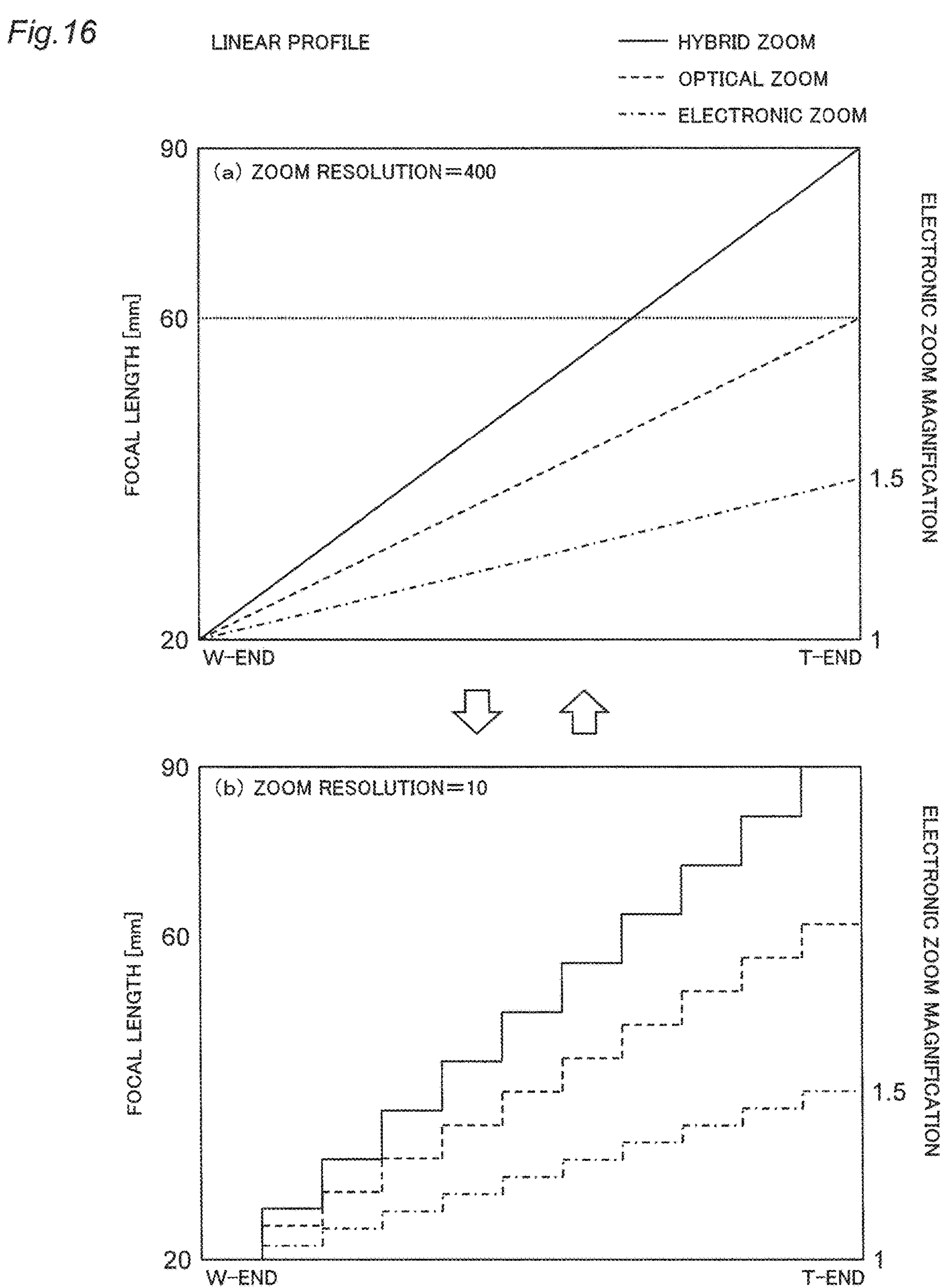
FIG. 16 is a diagram for illustrating substantial maintenance of a linear profile before and after the change of an interchangeable lens.

The graph (a) on the upper side in FIG. 16 is a graph illustrating a linear profile when the interchangeable lens 200 having a zoom resolution of 400 is attached to the camera body 100. The graph (b) on the lower side in FIG. 16 is a graph illustrating a linear profile when the interchangeable lens 200 having a zoom resolution of 10 is attached to the camera body 100.

As shown in FIG. 16, in the interchangeable lens 200 having different zoom resolutions, changes in the focal length according to changes in the rotation angle of the zoom ring 222 are different from each other when viewed locally (microscopically). This is because, as illustrated in (b) in FIG. 16, when the resolution is low, there are many sections in which the focal length does not change even when the rotation angle of the zoom ring 222 is changed.

Although there is a local difference as described above before and after the change of the interchangeable lens 200, the digital camera 1 according to the present embodiment substantially maintains the profile data indicating the change in the focal length of the hybrid zoom operation according to the change in the rotation angle of the zoom ring 222. For example, in the linear profile in FIG. 16, the camera controller 140 maintains the change rate (inclination) of the focal length from the W-end to the T-end before and after the change of the interchangeable lens 200. In the example in FIG. 16, in both graphs (a) and (b), the inclination of the regression line or the approximate line with respect to the solid line indicating the focal length of the hybrid zoom operation is maintained to be the same.

To enable such maintenance of the profile data, the camera controller 140 maintains the change rate of the magnification of the electronic zoom before and after the change of the interchangeable lens 200.

Figure 17:
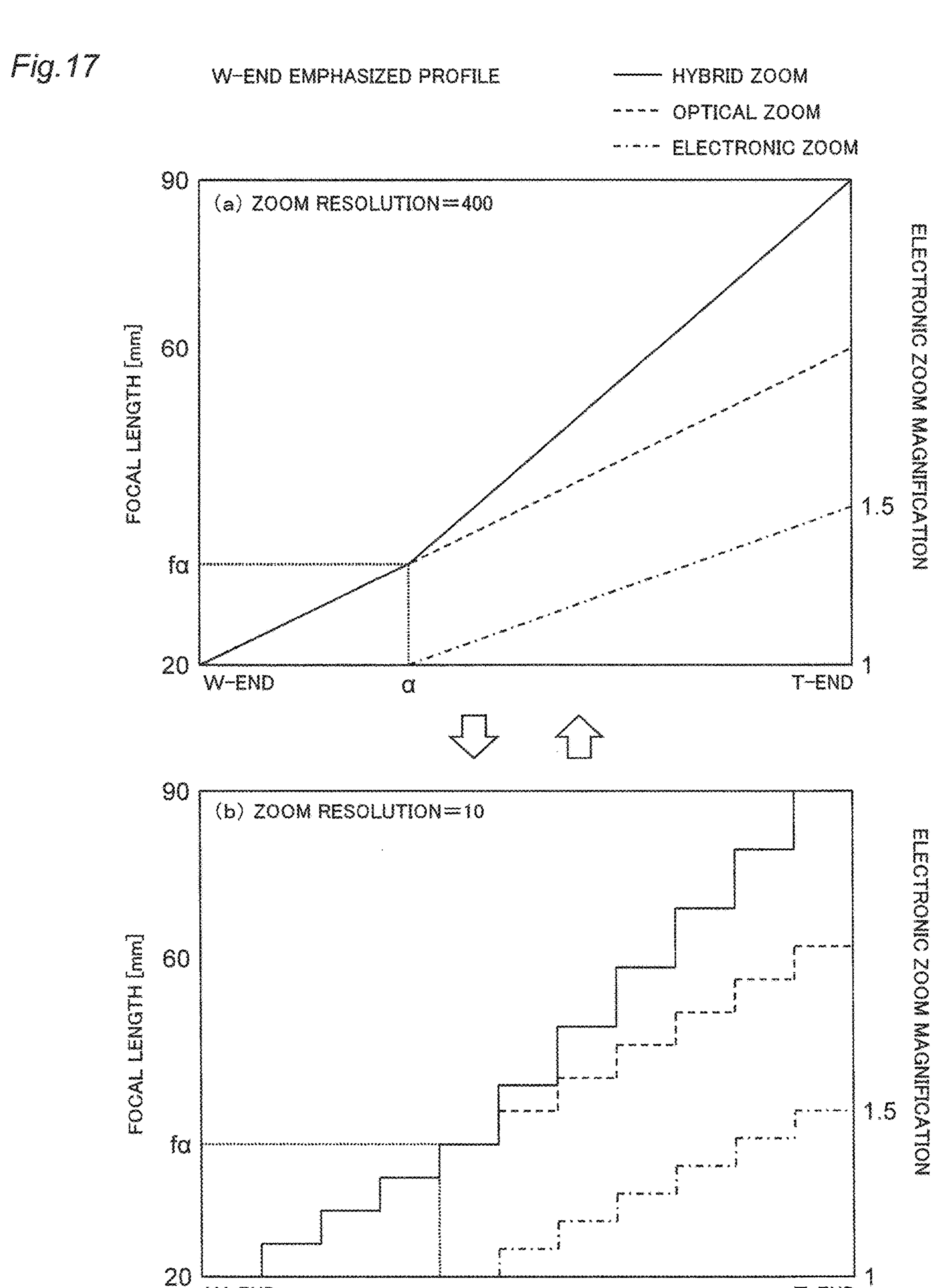
FIG. 17 is a diagram for illustrating substantial maintenance of a W-end emphasized profile before and after the change of an interchangeable lens.

The graph (a) on the upper side in FIG. 17 is a graph illustrating a W-end emphasized profile when the interchangeable lens 200 having a zoom resolution of 400 is attached to the camera body 100. The graph (b) on the lower side in FIG. 17 is a graph illustrating a W-end emphasized profile when the interchangeable lens 200 having a zoom resolution of 10 is attached to the camera body 100.

In the W-end emphasized mode, before and after the change of the interchangeable lens 200, the camera controller 140 maintains each of the change rate of the focal length when the rotation angle of the zoom ring 222 is between the W-end and the threshold angle α and the change rate of the focal length when the rotation angle is between the threshold angle α and the T-end.

Figure 18:
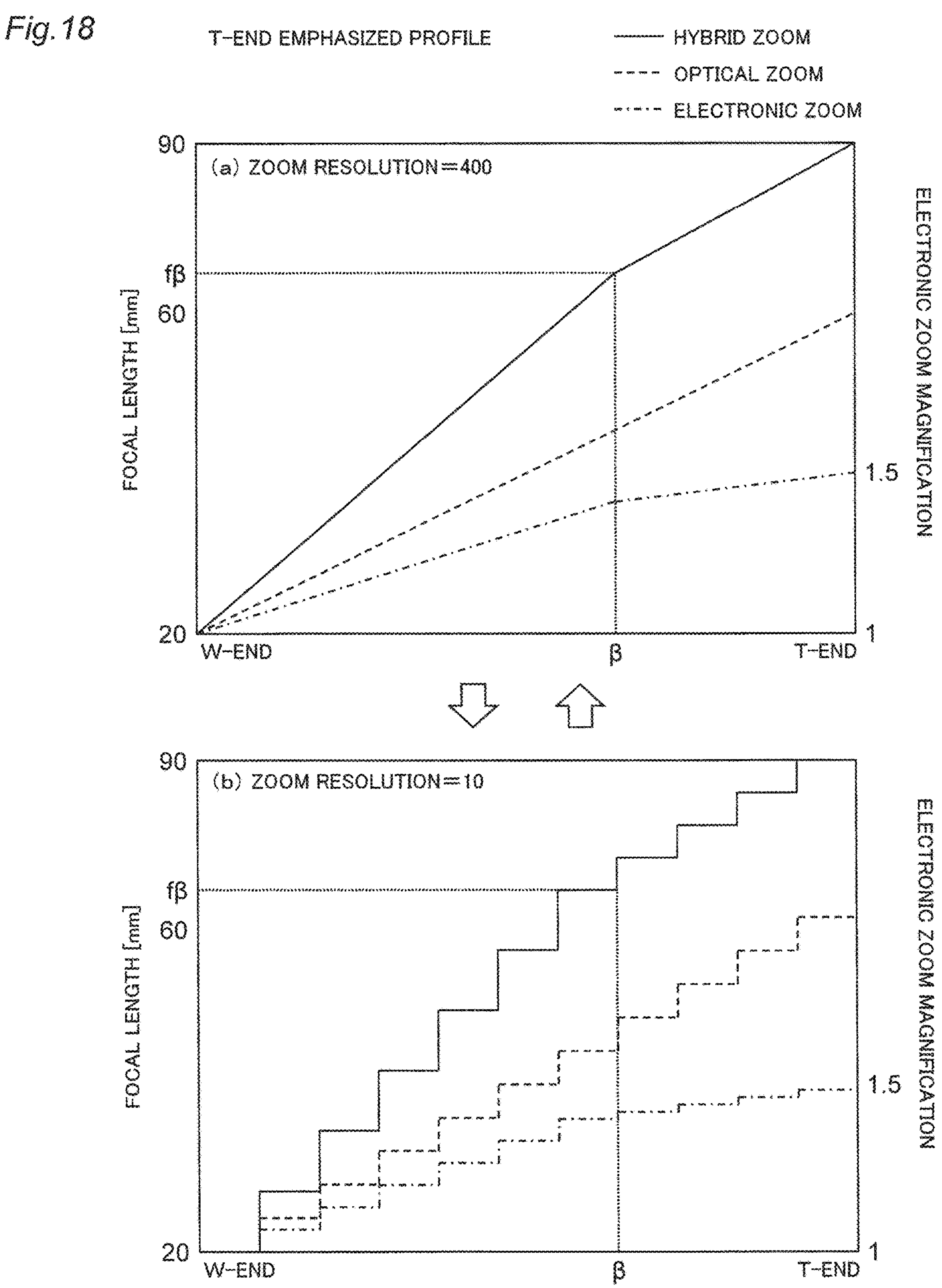
FIG. 18 is a diagram for illustrating substantial maintenance of a T-end emphasized profile before and after the change of an interchangeable lens.

The graph (a) on the upper side in FIG. 18 is a graph illustrating a T-end emphasized profile when the interchangeable lens 200 having a zoom resolution of 400 is attached to the camera body 100. The graph (b) on the lower side in FIG. 18 is a graph illustrating a T-end emphasized profile when the interchangeable lens 200 having a zoom resolution of 10 is attached to the camera body 100.

In the T-end emphasized mode, before and after the change of the interchangeable lens 200, the camera controller 140 maintains each of the change rate of the focal length when the rotation angle of the zoom ring 222 is between the W-end and the threshold angle β and the change rate of the focal length when the rotation angle is between the threshold angle β and the T-end.

Figure 19:
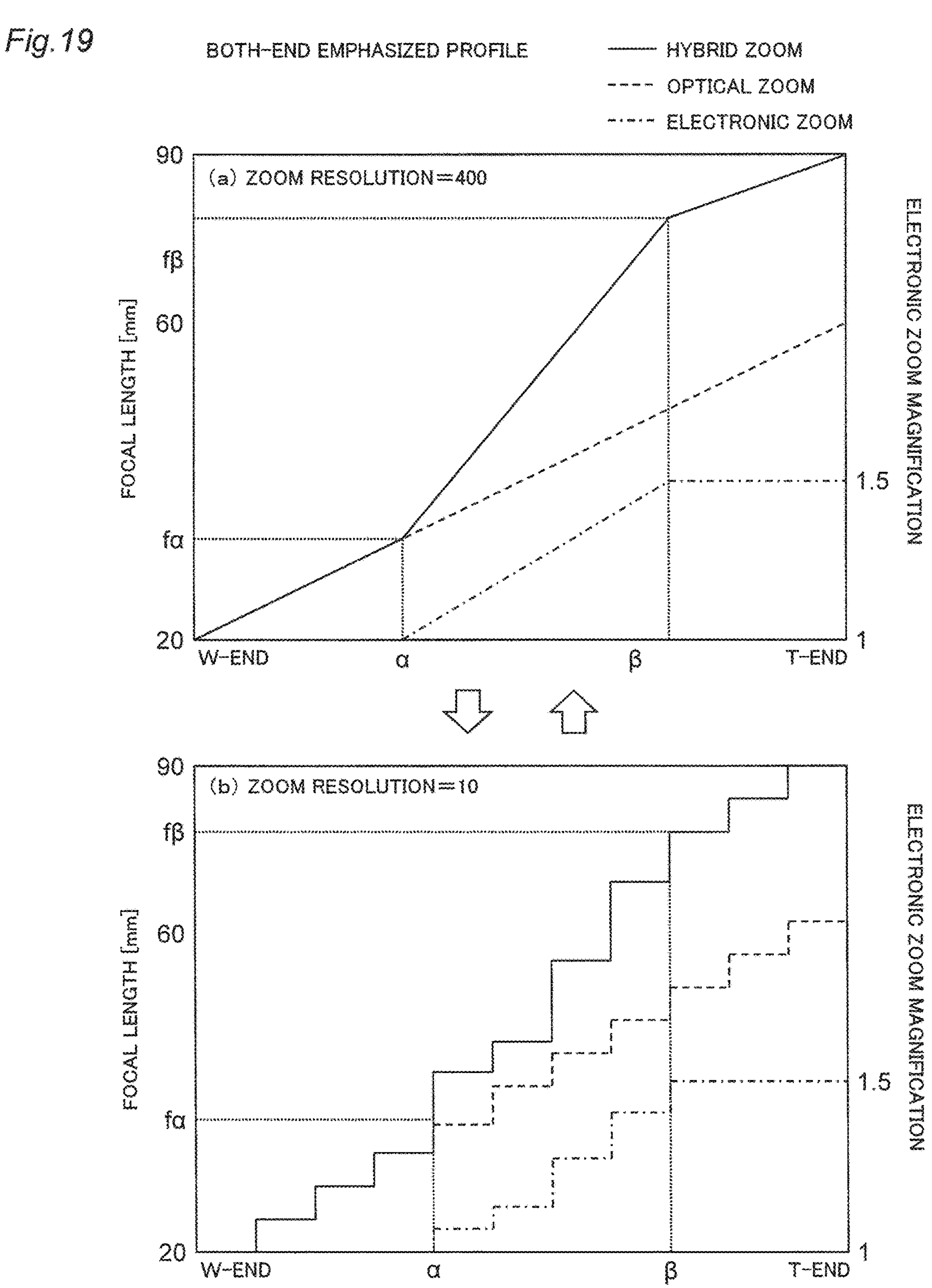
FIG. 19 is a diagram for illustrating substantial maintenance of a both-end emphasized profile before and after the change of an interchangeable lens.

The graph (a) on the upper side in FIG. 19 is a graph illustrating a both-end emphasized profile when the interchangeable lens 200 having a zoom resolution of 400 is attached to the camera body 100. The graph (b) on the lower side in FIG. 19 is a graph illustrating a both-end emphasized profile when the interchangeable lens 200 having a zoom resolution of 10 is attached to the camera body 100.

In the both-end emphasized mode, before and after the change of the interchangeable lens 200, the camera controller 140 maintains each of the change rate of the focal length when the rotation angle of the zoom ring 222 is between the W-end and the threshold angle α, the change rate of the focal length when the rotation angle is between the threshold angle α and the threshold angle β, and the change rate of the focal length when the rotation angle is between the threshold angle β and the T-end.

As described above, since the profile data is maintained before and after the change of the interchangeable lens 200, even when the interchangeable lens 200 is changed, the user can adjust the focal length with a favorite profile suitable for the user's operation feeling of the zoom ring 222.

2-5. Complement Mode

Hereinafter, details of the complement mode shown in step S8 in FIG. 2 will be described. The complement mode is turned ON when the zoom resolution is the reference level or less.

Figure 20:
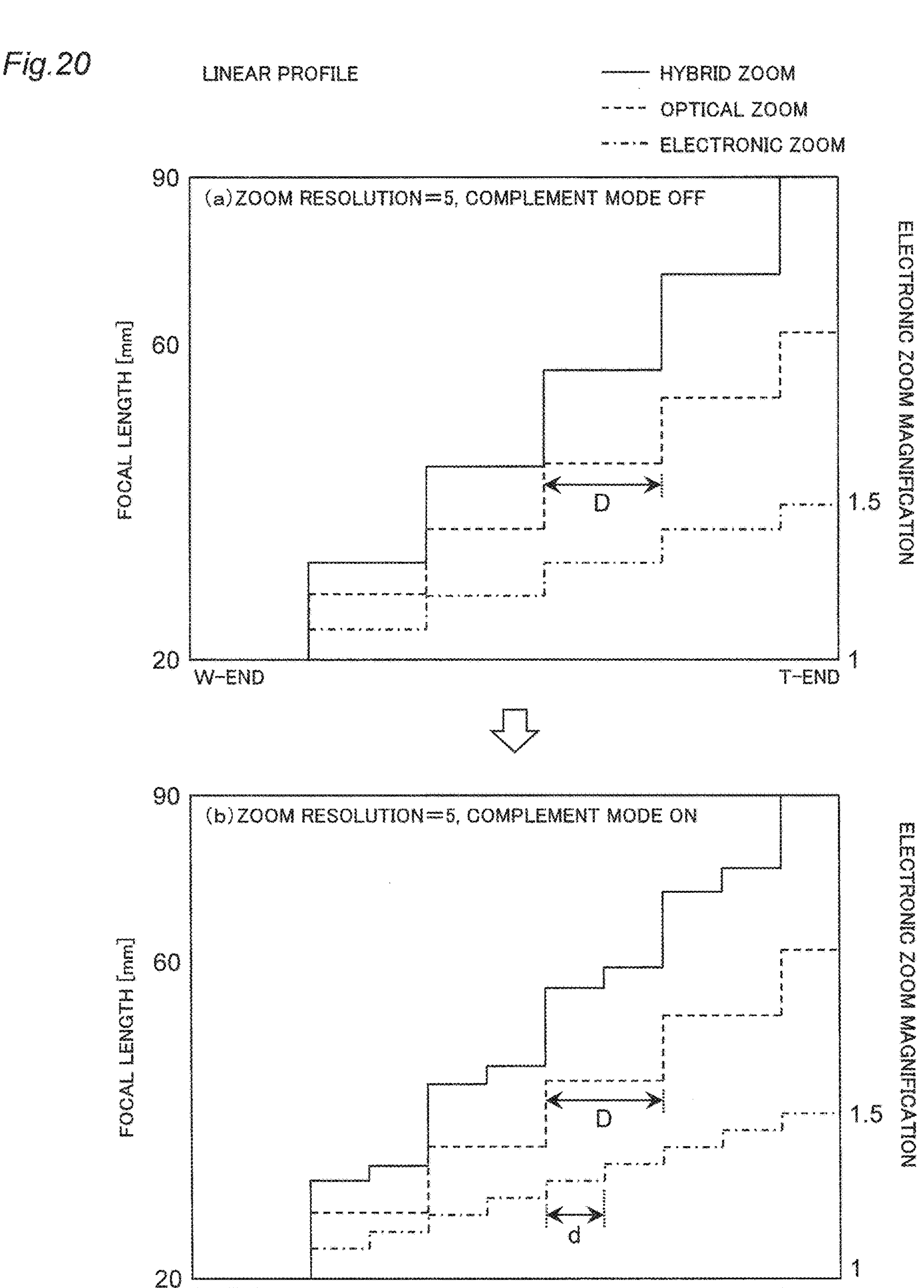
FIG. 20 is a diagram for illustrating a complement mode in the digital camera.

FIG. 20 is a diagram for illustrating the complement mode. As a comparative example, the graph (a) on the upper side in FIG. 20 is a graph illustrating a linear profile when the complement mode is OFF when the interchangeable lens 200 having a zoom resolution of 5 is attached to the camera body 100. The graph (a) on the lower side in FIG. 20 is a graph illustrating a linear profile when the complement mode is ON in the above case.

As shown in (a) in FIG. 20, when the zoom resolution is the reference level or less (N=5 in FIG. 20), the focal length may rapidly change when the rotation angle of the zoom ring 222 becomes a predetermined value, and the user's sense of use may deteriorate.

Therefore, in the present embodiment, when the zoom resolution is the reference level or less, the camera controller 140 turns on the complement mode. In a state where the complement mode is ON, the camera controller 140 sets the frequency of the change in magnification of the electronic zoom with respect to the change in the zoom amount to be higher than that when the complement mode is OFF.

For example, in a state where the complement mode is ON, the camera controller 140 changes the magnification of the electronic zoom at an interval d smaller than a difference D (see FIG. 20) between the rotation angles of the zoom ring 222 in which the focal length of the optical zoom changes. The magnification of the electronic zoom that changes for each interval d is set to be smaller than the magnification of the electronic zoom that changes when the rotation angle of the zoom ring 222 moves by D when the complement mode is OFF. The d is greater than 0 and smaller than the D. For example, d=0.5D.

Accordingly, in a state where the complement mode is ON, the digital camera 1 can reduce the degree to which the focal length rapidly changes when the rotation angle of the zoom ring 222 reaches a predetermined value.

In FIG. 20, an example has been described in which the complement mode is applied to the linear profile. However, the complement mode can be applied to the profile also in the W-end emphasized mode, the T-end emphasized mode, and the both-end emphasized mode.

3. Summary

As described above, the digital camera 1 according to the present embodiment, which is an example of an imaging apparatus, includes the camera body 100, the imaging sensor, the body mount 160 which is an example of an input interface, and the camera controller 140 which is an example of a controller. An interchangeable lens 200, which is an example of an optical system, is detachable from the camera body 100. The imaging sensor captures a subject image via the interchangeable lens 200 to generate image data. The body mount 160 acquires a zoom amount indicating the degree of the zoom operation of the user for the interchangeable lens 200. The camera controller 140 is configured to scale a cropped image from the image data (S12) so as to implement a hybrid zoom operation which changes, from an optical focal length, which is an example of a first focal length, the focal length (composite focal length) of the hybrid zoom operation, which is an example of a second focal length, according to the zoom amount acquired by the body mount 160, the optical focal length being formed by the interchangeable lens 200 and the composite focal length corresponding to an angle of view of the subject image in the image data. The camera controller 140 is configured to maintain the characteristics of the composite focal length with respect to the zoom amount before and after the interchangeable lens 200 is changed.

According to the digital camera 1 described above, even when the interchangeable lens 200 is changed, it is possible to easily capture an image in a range of a focal length desirable for the user.

In the digital camera 1 of the present embodiment, the interchangeable lens 200 before the change and the interchangeable lens 200 after the change may be lenses classified with the same resolution. According to this configuration, even when the interchangeable lens 200 is changed, the resolution does not change, so that the user can capture an image in a range of a focal length desirable for the user.

In the digital camera 1 of the present embodiment, the interchangeable lens 200 before the change and the interchangeable lens 200 after the change may be lenses having different zoom resolutions. According to this configuration, even when the lens is replaced with a lens having a different zoom resolution, the user can capture an image in a range of a focal length desirable for the user.

In the digital camera 1 of the present embodiment, the interchangeable lens 200 may include a zoom lens. The digital camera 1 may further include a zoom ring 222 capable of moving the zoom lens by rotation. The zoom operation is an operation of rotating the zoom ring 222. According to this configuration, the user can perform the zoom operation by an operation suitable for the user's operation feeling of the zoom ring 222, and it is easy to capture an image in a range of a focal length desirable for the user.

In the digital camera 1 of the present embodiment, the camera controller 140 may change the magnification of the scaling continuously or intermittently from the W-end to the T-end of the interchangeable lens 200.

The digital camera 1 of the present embodiment may further include an operation unit 150 that receives a user operation for setting the characteristic of the composite focal length. Before and after the change of the interchangeable lens 200, the camera controller 140 maintains the characteristics of the composite focal length set based on the user operation before the interchangeable lens 200 is changed. According to this configuration, even when the interchangeable lens 200 is changed, the characteristics of the composite focal length set by the user are maintained. Therefore, the digital camera 1 makes it possible to easily capture an image in a range of a focal length desirable for the user.

In the digital camera 1 of the present embodiment, the characteristic of the composite focal length may include a characteristic that the composite focal length linearly changes from the W-end to the T-end of the interchangeable lens 200 according to the zoom amount.

In the digital camera 1 of the present embodiment, the characteristics of the composite focal length may include the following characteristics.

Between the W-end of the interchangeable lens 200 and a predetermined position between the W-end and the T-end, the composite focal length changes at a first change rate with respect to the change in the zoom amount.

Between the predetermined position and the T-end, the composite focal length changes at a second change rate different from the first change rate with respect to the change in the zoom amount.

In this case, the digital camera 1 may further include an operation unit 150 that receives a user operation for setting a predetermined position.

In the digital camera 1 of the present embodiment, the characteristics of the composite focal length may include the following characteristics.

Between the W-end of the interchangeable lens 200 and the first predetermined position which is between the W-end and the T-end, the composite focal length changes at a first change rate with respect to the change in the zoom amount.

Between the first predetermined position and the second predetermined position which is between the first predetermined position and the T-end, the composite focal length changes at a second change rate different from the first change rate with respect to the change in the zoom amount.

Between the second predetermined position and the T-end, the composite focal length changes at a third change rate different from the second change rate with respect to the change in the zoom amount.

In this case, the digital camera 1 may further include an operation unit 150 that receives a user operation for setting the first predetermined position and the second predetermined position.

By having the characteristics of the composite focal length as described above, the user can perform the zoom operation by an operation suitable for the user's favorite operation feeling of the zoom ring 222. Therefore, the digital camera 1 of the present embodiment makes it possible to easily capture an image in a range of a focal length desirable for the user.

The digital camera 1 of the present embodiment may further include a display monitor 130 which is an example of a display. The camera controller 140 causes the display monitor 130 to display information indicating the composite focal length. The information indicating the composite focal length may be a numerical value indicating the composite focal length. The display color of the information indicating the composite focal length may be different from the display color of the information indicating the optical focal length. According to this configuration, the user can know the composite focal length by checking the information displayed on the display monitor 130.

In the digital camera 1 of the present embodiment, the camera controller 140 may acquire the resolution data indicating the zoom resolution of the interchangeable lens 200 (S5), and if the zoom resolution indicated by the resolution data is the reference level or less (No in S6), the camera controller 140 may increase the frequency of the change in the magnification of the magnification change with respect to the change in the zoom amount as compared with when the zoom resolution is higher than the reference level (S8). According to this configuration, it is possible to reduce the degree to which the focal length rapidly changes when the zoom amount reaches a predetermined value.

4. Other Embodiments

As described above, the embodiments have been described as exemplifications of the technique in the present disclosure. However, the technique in the present disclosure is not limited thereto, and can also be applied to embodiments in which changes, substitutions, additions, omissions, and the like are made as appropriate. In addition, it is possible to combine the respective components described in the above-described embodiments to obtain a new embodiment. Therefore, modifications as other embodiments will be exemplified below.

4-1. First Modification

In the above embodiments, it has been described that the user can select any one of the modes: (i) W-end emphasized, (ii) T-end emphasized, (iii) both-end emphasized, and (iv) OFF (linear profile). However, the present disclosure is not limited thereto. For example, the user-selectable profile may be only a linear profile. Even in this case, the camera controller 140 substantially maintains the selected linear profile as the characteristic of the composite focal length with respect to the rotation angle of the zoom ring 222 before and after the change of the interchangeable lens 200.

4-2. Second Modification

For example, the number of recording pixels of the image is selected from among the 24M (L size), the 12M (M size), and the 6M (S size). For example, the recording size of the image is set to L size when the composite focal length F is near the W-end of 20.0 mm (when the crop magnification C is 1×), set to M size when 20.1 mm≤F≤50.0 mm (1<C≤1.4), and set to S size when 50.0 mm<F≤120 mm (1.4<C≤2).

In the above setting, even when the user performs photographing in a state where the zoom ring 222 is moved to the W-end in order to record an image with the L size, the recording size may become the M size when the zoom ring 222 moves by the focal length of 0.1 mm due to an erroneous operation or vibration. In addition, in the above setting, when the zoom ring 222 is operated near the W-end at the time of capturing a moving image, the angle of view rapidly changes, and the recorded moving image may appear jumpy.

Therefore, in the present modification, even when the hybrid zoom mode is turned on, when the zoom ring 222 is rotated within a range of a predetermined angle from the W-end (within a range of "play"), the camera controller 140 does not perform the crop zoom. The range of the predetermined angle is, for example, 10% of the rotation angle corresponding to from the W-end to the T-end with the W-end as a starting point. Such play setting is implementable as one setting of the W-end emphasized mode described in the above embodiment.

Alternatively, in the present modification, when the hybrid zoom mode is turned on, the camera controller 140 may cause the display monitor 130 to display a warning message in order to notify that an image may be recorded in a size not intended by the user. The warning message is, for example, a message such as "When hybrid zoom is used, the image size (L/M/S) is automatically switched according to the focal length".

According to the present modification, it is possible to prevent an image from being recorded with an image size not intended by the user. In addition, at the time of capturing a moving image, it is possible to prevent the angle of view of the moving image from changing suddenly and unintentionally.

4-3. Third Modification

In the above embodiment, the zoom operation is exemplified to be performed using the rotation operation of the zoom ring 222, but the zoom operation of the present disclosure is not limited thereto. For example, the zoom lens 220 may be an electric type, and in this case, an operation by a zoom lever, a function button, or the like may be used as the zoom operation.

4-4. Fourth Modification

In the above embodiment, an example has been described in which the profile setting processing S3 and the hybrid zoom operation (S12) according to the set profile data are performed in the hybrid zoom mode (Yes in S1), but the present disclosure is not limited thereto. For example, even when performing the zoom operation using only the electric optical zoom, the camera controller 140 may perform the profile setting processing and the zoom operation according to the set profile data. In addition, for example, the camera controller 140 may perform the profile setting processing, and the zoom operation according to the set profile data, even when the zoom operation is performed using only the crop zoom, such as when a single focal lens is used.

5. Example of Aspects

Hereinafter, various aspects according to the present disclosure will be listed.

<Aspect 1>

An imaging apparatus comprising:

a body to and from which an optical system is configured to be attachable and detachable;

an imaging sensor configured to capture a subject image via the optical system to generate image data;

an input interface configured to acquire a zoom amount indicating a degree of a zoom operation by a user for the optical system; and a controller configured to scale a cropped image from the image data so as to implement a hybrid zoom operation which changes, from a first focal length, a second focal length, according to the zoom amount acquired by the input interface, the first focal length being formed by the optical system and the second focal length corresponding to an angle of view of the subject image in the image data, wherein the controller is configured to maintain a characteristic of the second focal length with respect to the zoom amount before and after the optical system is changed.

<Aspect 2>

The imaging apparatus according to aspect 1, wherein the optical system before the change and the optical system after the change are lenses classified with the same resolution.

<Aspect 3>

The imaging apparatus according to aspect 1, wherein the optical system before the change and the optical system after the change are lenses having different zoom resolutions.

<Aspect 4>

The imaging apparatus according to any one of aspects 1 to 3, wherein the optical system includes a zoom lens, the imaging apparatus further comprises a zoom ring configured to move the zoom lens by rotating, and the zoom operation is an operation of rotating the zoom ring.

<Aspect 5>

The imaging apparatus according to any one of aspects 1 to 4, wherein the controller is configured to continuously or intermittently change magnification of the scaling from a wide-angle end to a telephoto end of the optical system.

<Aspect 6>

The imaging apparatus according to any one of aspects 1 to 5, further comprising a setting interface configured to receive a user operation for setting the characteristic of the second focal length, wherein, before and after a change of the optical system, the controller maintains the characteristic of the second focal length set based on the user operation before the optical system is changed.

<Aspect 7>

The imaging apparatus according to aspect 6, wherein the characteristic of the second focal length includes a characteristic that the second focal length linearly changes from a wide-angle end to a telephoto end of the optical system according to the zoom amount.

<Aspect 8>

The imaging apparatus according to aspect 6, wherein the characteristic of the second focal length includes a characteristic that the second focal length changes at a first change rate with respect to a change in the zoom amount between a wide-angle end of the optical system and a predetermined position which is between the wide-angle end and a telephoto end, and changes at a second change rate different from the first change rate with respect to the change in the zoom amount between the predetermined position and the telephoto end.

<Aspect 9>

The imaging apparatus according to aspect 8, wherein the setting interface is configured to receive a user operation for setting the predetermined position.

<Aspect 10>

The imaging apparatus according to aspect 6, wherein the characteristic of the second focal length includes a characteristic that the second focal length changes at a first change rate with respect to a change in the zoom amount between a wide-angle end of the optical system and a first predetermined position which is between the wide-angle end and a telephoto end, changes at a second change rate different from the first change rate with respect to a change in the zoom amount between the first predetermined position and a second predetermined position which is between the first predetermined position and the telephoto end, and changes at a third change rate different from the second change rate with respect to a change in the zoom amount between the second predetermined position and the telephoto end.

<Aspect 11>

The imaging apparatus according to aspect 10, wherein the setting interface is configured to receive a user operation for setting the first predetermined position and the second predetermined position.

<Aspect 12>

The imaging apparatus according to any one of aspects 1 to 11, further comprising a display, wherein the controller is configured to cause the display to display information indicating the second focal length.

<Aspect 13>

The imaging apparatus according to aspect 12, wherein the information indicating the second focal length is a numerical value indicating the second focal length.

<Aspect 14>

The imaging apparatus according to aspect 12, wherein the controller is configured to capable of causing the display to display information indicating the first focal length, a display color of the information indicating the second focal length is different from a display color of the information indicating the first focal length.

<Aspect 15>

The imaging apparatus according to any one of aspects 1 to 14, wherein the controller is configured to acquire resolution data indicating a zoom resolution of the optical system, and increase a frequency of a change in magnification of the scaling with respect to a change in the zoom amount as compared with when the zoom resolution is higher than a reference level when the zoom resolution indicated by the resolution data is the reference level or less.

<Aspect 16>

An imaging apparatus comprising:

a body to and from which an optical system is configured to be attached and detached;

an imaging sensor configured to capture a subject image via the optical system to generate image data;

an input interface configured to acquire a zoom amount indicating a degree of a zoom operation by a user for the optical system;

a controller configured to scale a cropped image from the image data so as to implement a hybrid zoom operation which changes, from a first focal length, a second focal length, according to the zoom amount acquired by the input interface, the first focal length being formed by the optical system and the second focal length corresponding to an angle of view of the subject image in the image data; and a setting interface configured to receive a user operation for setting a characteristic of the second focal length, wherein the controller is configured to change the second focal length according to the zoom amount based on the characteristic of the second focal length in the hybrid zoom operation.

<Aspect 17>

The imaging apparatus according to aspect 16, wherein the characteristic of the second focal length includes a characteristic that the second focal length linearly changes from a wide-angle end to a telephoto end of the optical system according to the zoom amount.

<Aspect 18>

The imaging apparatus according to aspect 16, wherein the characteristic of the second focal length includes a characteristic that the second focal length changes at a first change rate with respect to a change in the zoom amount between a wide-angle end of the optical system and a predetermined position which is between the wide-angle end and a telephoto end, and changes at a second change rate different from the first change rate with respect to the change in the zoom amount between the predetermined position and the telephoto end.

<Aspect 19>

The imaging apparatus according to aspect 18, wherein the setting interface is configured to receive a user operation for setting the predetermined position.

<Aspect 20>

The imaging apparatus according to aspect 16, wherein the characteristic of the second focal length includes a characteristic that the second focal length changes at a first change rate with respect to a change in the zoom amount between a wide-angle end of the optical system and a first predetermined position which is between the wide-angle end and a telephoto end, changes at a second change rate different from the first change rate with respect to a change in the zoom amount between the first predetermined position and a second predetermined position which is between the first predetermined position and the telephoto end, and changes at a third change rate different from the second change rate with respect to a change in the zoom amount between the second predetermined position and the telephoto end.

<Aspect 21>

The imaging apparatus according to aspect 20, wherein the setting interface is configured to receive a user operation for setting the first predetermined position and the second predetermined position.

The present disclosure is applicable to various imaging apparatuses.

What is claimed is:

1. An imaging apparatus comprising:

a body to and from which a first optical system is configured to be attachable and detachable;

an imaging sensor configured to capture a subject image via the first optical system to generate image data;

an input interface configured to acquire a zoom amount indicating a degree of a zoom operation by a user for the first optical system; and a controller configured to scale a cropped image from the image data so as to implement a hybrid zoom operation in which a second focal length is changed with respect to a first focal length, according to the zoom amount acquired by the input interface, the first focal length being formed by the first optical system and the second focal length corresponding to an angle of view of the subject image in the image data, wherein the controller is configured to maintain a characteristic of the second focal length with respect to the zoom amount before and after the first optical system is changed to a second optical system having different performance from the first optical system before the change.

2. The imaging apparatus according to claim 1, wherein the first optical system includes a zoom lens, the imaging apparatus further comprises a zoom ring configured to move the zoom lens by rotating, and the zoom operation is an operation of rotating the zoom ring.

3. The imaging apparatus according to claim 1, wherein the controller is configured to continuously or intermittently change magnification of the scaling from a wide-angle end to a telephoto end of the first optical system.

4. The imaging apparatus according to claim 1, further comprising a setting interface configured to receive a user operation for setting the characteristic of the second focal length, wherein, before and after a change of the first and second optical systems, the controller maintains the characteristic of the second focal length set based on the user operation before the first optical system is changed to the second optical system.

5. The imaging apparatus according to claim 4, wherein the characteristic of the second focal length includes a characteristic that the second focal length linearly changes from a wide-angle end to a telephoto end of the first optical system according to the zoom amount.

6. The imaging apparatus according to claim 4, wherein the characteristic of the second focal length includes a characteristic that the second focal length changes at a first change rate with respect to a change in the zoom amount between a wide-angle end of the first optical system and a predetermined position which is between the wide-angle end and a telephoto end, and changes at a second change rate different from the first change rate with respect to the change in the zoom amount between the predetermined position and the telephoto end.

7. The imaging apparatus according to claim 6, wherein the setting interface is configured to receive a user operation for setting the predetermined position.

8. The imaging apparatus according to claim 4, wherein the characteristic of the second focal length includes a characteristic that the second focal length changes at a first change rate with respect to a change in the zoom amount between a wide-angle end of the optical system and a first predetermined position which is between the wide-angle end and a telephoto end, changes at a second change rate different from the first change rate with respect to a change in the zoom amount between the first predetermined position and a second predetermined position which is between the first predetermined position and the telephoto end, and changes at a third change rate different from the second change rate with respect to a change in the zoom amount between the second predetermined position and the telephoto end.

9. The imaging apparatus according to claim 8, wherein the setting interface is configured to receive a user operation for setting the first predetermined position and the second predetermined position.

10. The imaging apparatus according to claim 1, further comprising a display, wherein the controller is configured to cause the display to display information indicating the second focal length.

11. An imaging apparatus comprising:

a body to and from which an optical system is configured to be attachable and detachable;

an imaging sensor configured to capture a subject image via the optical system to generate image data;

an input interface configured to acquire a zoom amount indicating a degree of a zoom operation by a user for the optical system; and a controller configured to scale a cropped image from the image data so as to implement a hybrid zoom operation in which a second focal length is changed with respect to a first focal length, according to the zoom amount acquired by the input interface, the first focal length being formed by the optical system and the second focal length corresponding to an angle of view of the subject image in the image data, wherein the controller is configured to maintain a characteristic of the second focal length with respect to the zoom amount before and after the optical system is changed, acquire resolution data indicating a zoom resolution of the optical system, and increase a frequency of a change in magnification of the scaling with respect to a change in the zoom amount as compared with when the zoom resolution is higher than a reference level when the zoom resolution indicated by the resolution data is the reference level or less.

* * * * *